US012427634B2

(12) United States Patent
Bierdeman et al.

(10) Patent No.: US 12,427,634 B2
(45) Date of Patent: Sep. 30, 2025

(54) GAS SPRING-POWERED FASTENER DRIVER

(71) Applicant: MILWAUKEE ELECTRIC TOOL CORPORATION, Brookfield, WI (US)

(72) Inventors: David Bierdeman, New Berlin, WI (US); Andrew R. Wyler, Pewaukee, WI (US); Nicholas A. Albers, Portland, OR (US); Mitchell Ellena, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 979 days.

(21) Appl. No.: 16/706,365

(22) Filed: Dec. 6, 2019

(65) Prior Publication Data

US 2020/0114500 A1 Apr. 16, 2020

Related U.S. Application Data

(63) Continuation-in-part of application No. 16/437,621, filed on Jun. 11, 2019.

(Continued)

(51) Int. Cl.
*B25C 1/04* (2006.01)
*B25C 1/00* (2006.01)

(52) U.S. Cl.
CPC .............. *B25C 1/041* (2013.01); *B25C 1/008* (2013.01); *B25C 1/047* (2013.01)

(58) Field of Classification Search
CPC ......... B25C 1/041; B25C 1/008; B25C 1/047; B25C 1/06; B25C 1/04

(Continued)

(56) References Cited

U.S. PATENT DOCUMENTS

| | | | |
|---|---|---|---|
| 2,801,415 A | 8/1957 | Jenny |
| 2,801,417 A | 8/1957 | Jenny |

(Continued)

FOREIGN PATENT DOCUMENTS

| | | |
|---|---|---|
| CN | 102554878 B | 7/2012 |
| CN | 102689289 B | 9/2012 |

(Continued)

OTHER PUBLICATIONS

International Search Report and Written Opinion for Application No. PCT/US2019/036520 dated Sep. 25, 2019 (14 pages).

(Continued)

*Primary Examiner* — Robert F Long
(74) *Attorney, Agent, or Firm* — Michael Best & Friedrich LLP

(57) ABSTRACT

A gas spring-powered fastener driver includes a cylinder, a moveable piston positioned within the cylinder, and a driver blade attached to the piston and movable therewith between a top-dead-center (TDC) position and a driven or bottom-dead-center (BDC) position. The driver blade defines a driving axis. The driver blade includes a body having a first side and an opposite, second side with the driving axis passing therebetween. A plurality of teeth extends from the first side of the body. A plurality of projections extends from the second side of the body. The body, the teeth, and the projections are bisected by a common plane. A lifter is operable to move the driver blade from the BDC position toward the TDC position, and is engageable with the teeth. A latch assembly is movable between a latched state, and a released state. The latch assembly is configured to engage with the projections.

9 Claims, 24 Drawing Sheets

Related U.S. Application Data

(60) Provisional application No. 62/683,460, filed on Jun. 11, 2018.

(58) Field of Classification Search
USPC ..................................... 227/107–155; 173/90
See application file for complete search history.

(56) References Cited

U.S. PATENT DOCUMENTS 2,801,418 A 8/1957 Jenny
2,850,738 A 9/1958 Campbell et al.
3,049,715 A 8/1962 Allen
3,190,187 A 6/1965 Doyle
3,198,412 A 8/1965 Roosa
3,496,840 A 2/1970 Wandel et al.
3,673,922 A 7/1972 Doyle
3,760,695 A 9/1973 Rothfuss
3,776,445 A 12/1973 Pomeroy
3,945,120 A 3/1976 Ritz
3,952,814 A 4/1976 Gelfand et al.
3,969,989 A 7/1976 Maurer et al.
4,129,240 A 12/1978 Geist
4,197,974 A 4/1980 Morton et al.
4,441,644 A 4/1984 Farian
4,442,670 A 4/1984 Goldman
4,463,888 A 8/1984 Geist et al.
4,510,894 A 4/1985 Williams
4,624,401 A 11/1986 Gassner et al.
4,739,915 A 4/1988 Cotta
4,753,115 A 6/1988 Moody
4,879,875 A 11/1989 Davert et al.
5,025,971 A 6/1991 Schafer et al.
5,091,123 A * 2/1992 Fealey .................... B25C 1/047 156/152
5,138,908 A 8/1992 Raetz et al.
5,197,647 A 3/1993 Howell
5,219,110 A 6/1993 Mukoyama
5,297,713 A 3/1994 Perra et al.
5,309,714 A 5/1994 Putney et al.
5,322,189 A 6/1994 Oda
5,433,367 A 7/1995 Liu
5,441,192 A 8/1995 Sugita et al.
5,720,423 A * 2/1998 Kondo ...................... B25C 1/04 227/130
5,722,643 A 3/1998 Chamberlin et al.
5,853,211 A 12/1998 Sawdon et al.
5,924,671 A 7/1999 Baumann
5,937,683 A * 8/1999 Chartier ................... B21D 1/12 72/21.5
5,951,449 A 9/1999 Oppriecht
6,012,622 A 1/2000 Weinger et al.
6,076,799 A 6/2000 Baumann
6,168,093 B1 1/2001 Greer, Jr. et al.
6,176,412 B1 1/2001 Weinger et al.
6,179,192 B1 1/2001 Weinger et al.
6,267,284 B1 7/2001 Clark
6,296,167 B1 10/2001 Jen
6,357,534 B1 3/2002 Buetow et al.
6,679,411 B2 1/2004 Popovich et al.
6,698,200 B1 3/2004 Rauen
6,705,503 B1 3/2004 Pedicini et al.
7,064,462 B2 6/2006 Hempe et al.
7,175,064 B2 2/2007 Schell et al.
7,201,301 B2 4/2007 Moeller et al.
7,225,768 B2 6/2007 Akiba et al.
7,284,685 B1 10/2007 Wojcicki
7,299,959 B2 11/2007 Ishizawa et al.
7,314,025 B2 1/2008 Shkolnikov et al.
7,316,209 B2 1/2008 Akiba et al.
7,320,422 B2 1/2008 Schell et al.
7,407,071 B2 8/2008 Sperrfechter et al.
7,516,532 B2 4/2009 Wojcicki
7,549,562 B2 6/2009 Wu et al.
7,584,723 B2 9/2009 Schkolnikov et al.
7,591,236 B2 9/2009 Moeller et al.
7,712,647 B2 5/2010 Tanji
7,726,533 B2 6/2010 Wojcicki
8,011,441 B2 9/2011 Leimbach et al.
8,011,547 B2 9/2011 Leimbach et al.
8,074,855 B2 12/2011 Johnson
8,230,941 B2 7/2012 Leimbach et al.
8,267,296 B2 9/2012 Leimbach et al.
8,267,297 B2 9/2012 Leimbach et al.
8,286,722 B2 10/2012 Leimbach et al.
8,292,144 B2 10/2012 Maltais et al.
8,336,748 B2 12/2012 Hlinka et al.
8,387,718 B2 3/2013 Leimbach et al.
8,387,845 B2 3/2013 Franz
8,397,967 B2 3/2013 Calvet et al.
8,408,438 B2 4/2013 Taylor
8,418,587 B2 * 4/2013 DeBaker ............... B25B 15/005 81/436
8,556,148 B2 10/2013 Schell et al.
8,567,654 B2 10/2013 Wu et al.
8,602,282 B2 12/2013 Leimbach et al.
8,733,609 B2 5/2014 Weigmann et al.
8,746,526 B2 6/2014 Hlinka et al.
8,763,874 B2 7/2014 McCardle et al.
8,844,787 B2 9/2014 Shima et al.
8,899,460 B2 12/2014 Wojcicki
9,126,318 B2 9/2015 Cheung et al.
9,469,021 B2 10/2016 Gregory et al.
9,486,904 B2 11/2016 Gregory et al.
9,492,915 B2 11/2016 Largo et al.
9,498,871 B2 11/2016 Gregory et al.
9,539,714 B1 1/2017 Pedicini
9,643,305 B2 5/2017 Gregory et al.
9,649,755 B2 5/2017 Gregory et al.
9,664,045 B2 5/2017 Mina et al.
9,676,041 B2 * 6/2017 Allen .................. B23B 51/0081
9,676,088 B2 6/2017 Leimbach et al.
9,827,658 B2 11/2017 Gregory et al.
9,868,196 B2 1/2018 Chien
9,912,020 B2 3/2018 Glasgow et al.
10,126,107 B2 * 11/2018 Khangar .............. G01B 3/1056
10,173,310 B2 1/2019 Wyler et al.
10,625,407 B2 * 4/2020 Sato .......................... B25C 1/06
10,632,600 B2 * 4/2020 Pomeroy ................... B25C 1/06
10,632,601 B2 * 4/2020 Pomeroy ................. B25C 1/047
10,654,155 B2 * 5/2020 Meyer ..................... B25C 1/008
10,821,586 B2 * 11/2020 Wu ......................... B25C 1/047
10,821,591 B2 11/2020 Verbrugge et al.
10,898,994 B2 * 1/2021 Carrier .................... B25C 1/047
2003/0121948 A1 7/2003 Hsien
2004/0150137 A1 8/2004 Palmer et al.
2005/0194419 A1 * 9/2005 Smolinski ............... B25C 1/047 227/130
2006/0086210 A1 4/2006 Kingham
2006/0175373 A1 8/2006 Erhardt et al.
2006/0175374 A1 8/2006 Zahner et al.
2006/0180631 A1 8/2006 Pedicini et al.
2006/0186171 A1 8/2006 Porth et al.
2007/0034659 A1 2/2007 Moeller et al.
2007/0187452 A1 * 8/2007 Budzisz .................... B25C 1/00 227/147
2007/0210134 A1 9/2007 Oda et al.
2007/0271761 A1 11/2007 Haytayan
2008/0067212 A1 3/2008 Wen
2008/0179371 A1 7/2008 Gardner et al.
2008/0190986 A1 8/2008 Chang et al.
2008/0190988 A1 8/2008 Pedicini et al.
2009/0194573 A1 8/2009 Liang et al.
2009/0250500 A1 10/2009 Brendel et al.
2009/0321495 A1 12/2009 Hirabayashi et al.
2010/0012446 A1 1/2010 Ollat et al.
2010/0155096 A1 * 6/2010 Morrison .................. E21B 1/02 173/206
2010/0213235 A1 8/2010 Pedicini et al.
2011/0180582 A1 7/2011 Cordeiro et al.
2011/0198381 A1 * 8/2011 McCardle ................. B25C 1/06 227/8
2012/0090850 A1 4/2012 Botich
2012/0160889 A1 6/2012 Tanji
2012/0227389 A1 9/2012 Hinderks

(56) References Cited

U.S. PATENT DOCUMENTS

2013/0320063 A1 12/2013 Gregory et al.
2013/0320064 A1 12/2013 Gregory et al.
2014/0034700 A1 2/2014 Chang
2014/0087631 A1 3/2014 Raghavan et al.
2014/0174839 A1 6/2014 Steben et al.
2014/0260231 A1 9/2014 Burns
2014/0361066 A1 12/2014 Liu et al.
2015/0102084 A1 4/2015 Zhao
2015/0196995 A1* 7/2015 Neitzell .............. B25B 23/0007 81/436
2015/0275849 A1 10/2015 Sieber et al.
2016/0096259 A1 4/2016 Pedicini
2016/0144497 A1 5/2016 Boehm et al.
2016/0229043 A1 8/2016 Wyler et al.
2016/0288305 A1 10/2016 McCardle et al.
2016/0325420 A1 11/2016 Krout et al.
2016/0333542 A1 11/2016 Jinnings et al.
2017/0016555 A1 1/2017 Franconi
2017/0036333 A1 2/2017 Lin
2017/0036334 A1 2/2017 Baskar et al.
2017/0049452 A1 2/2017 Milliman
2017/0066116 A1 3/2017 Garber et al.
2017/0100829 A1 4/2017 Pedicini et al.
2017/0175696 A1 6/2017 Florijancic et al.
2017/0190037 A1 7/2017 Sato et al.
2017/0217004 A1 8/2017 Kato
2017/0254204 A1 9/2017 Mina et al.
2017/0266796 A1 9/2017 Leimbach et al.
2017/0274513 A1 9/2017 Pedicini et al.
2018/0001461 A1 1/2018 Pedicini et al.
2018/0022049 A1 1/2018 Montgomery
2018/0036870 A1 2/2018 Komazaki et al.
2018/0071904 A1 3/2018 Gregory et al.
2018/0085904 A1 3/2018 Gregory et al.
2018/0126527 A1 5/2018 Pomeroy et al.
2018/0126528 A1 5/2018 Pomeroy et al.
2018/0126529 A1* 5/2018 Pomeroy ................. B25C 1/008
2018/0126530 A1 5/2018 Pomeroy et al.
2018/0126532 A1* 5/2018 Pomeroy ................... B25C 5/13
2018/0152076 A1 5/2018 Alei et al.
2018/0154505 A1 6/2018 Sato et al.
2018/0169846 A1 6/2018 Fan et al.
2018/0178361 A1* 6/2018 Kabbes ................... B25C 1/008
2018/0193990 A1 7/2018 Zhao et al.
2018/0290279 A1* 10/2018 Kobori .................... B25C 1/047
2019/0091845 A1 3/2019 Wyler et al.
2019/0126453 A1 5/2019 Po
2019/0168366 A1 6/2019 Yasutomi et al.
2019/0201597 A1 7/2019 Shelton, IV et al.
2019/0224833 A1 7/2019 Watanabe et al.
2019/0366527 A1* 12/2019 Akiba ....................... B25C 7/00
2019/0375084 A1* 12/2019 Bierdeman ............... B25C 1/06
2019/0381643 A1 12/2019 Fan
2020/0030953 A1* 1/2020 Tan ......................... B25C 1/047
2020/0114500 A1 4/2020 Bierdeman et al.
2020/0164498 A1* 5/2020 Wechselberger ....... B25C 1/047
2020/0223044 A1* 7/2020 Xiao Chuan ........... B25C 1/047
2020/0282534 A1 9/2020 Po
2021/0008701 A1* 1/2021 Tan ........................... B25C 1/06
2021/0205969 A1 7/2021 Zhu
2021/0291335 A1 9/2021 Liu et al.
2021/0299835 A1* 9/2021 Ward ...................... B25C 1/005
2021/0316433 A1 10/2021 Ueda et al.
2021/0347023 A1* 11/2021 Carrier ...................... B25C 1/06
2022/0134525 A1* 5/2022 Bandy ................... B25C 5/1665 227/123
2022/0143798 A1* 5/2022 Cholst ..................... B25C 1/041
2022/0219301 A1* 7/2022 Bierdeman ............. B25C 1/041
2022/0250222 A1* 8/2022 Garces .................... B25C 1/047

FOREIGN PATENT DOCUMENTS

CN 202702169 U 1/2013
CN 103707264 B 4/2014
CN 203863632 U 10/2014
CN 204136014 U 2/2015
CN 105818099 A 8/2016
CN 205835215 U 12/2016
CN 106457539 A 2/2017
CN 107020674 A 8/2017
CN 107249823 A 10/2017
CN 107708934 A 2/2018
DE 1403600 A1 7/1959
DE 6915710 U 9/1969
DE 2510858 C2 9/1976
DE 8711784 U1 11/1987
DE 112018002619 T5 5/2020
EP 0147601 A1 7/1985
JP H0617882 U 3/1994
JP 2006017882 U 1/2006
NO 2016046188 A1 9/2016
WO 2008149902 A1 12/2008
WO 2016190133 A1 12/2016
WO 2017056810 A1 4/2017
WO 2017061425 A1 4/2017
WO 2018061556 A1 4/2018

OTHER PUBLICATIONS

International Search Report and Written Opinion for International Application No. PCT/US2020/063204 dated May 3, 2021 (13 pages).

* cited by examiner

GAS SPRING-POWERED FASTENER DRIVER

CROSS-REFERENCE TO RELATED APPLICATIONS

This application is a continuation-in-part of co-pending U.S. patent application Ser. No. 16/437,621 filed on Jun. 11, 2019, which claims priority to U.S. Provisional Patent Application No. 62/683,460 filed on Jun. 11, 2018, the entire contents of both of which are incorporated herein by reference.

FIELD OF THE INVENTION

The present invention relates to powered fastener drivers, and more specifically to gas spring-powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g. compressed air generated by an air compressor, electrical energy, a flywheel mechanism, etc.), but often these designs are met with power, size, and cost constraints.

SUMMARY OF THE INVENTION

The present invention provides, in one aspect, a gas spring-powered fastener driver including a cylinder, a moveable piston positioned within the cylinder, and a driver blade attached to the piston and movable therewith between a top-dead-center (TDC) position and a driven or bottom-dead-center (BDC) position. The driver blade defines a driving axis. The driver blade includes a body having a first side and an opposite, second side with the driving axis passing therebetween. A plurality of teeth extends from the first side of the body. A plurality of projections extends from the second side of the body. The body, the teeth, and the projections are bisected by a common plane. A lifter is operable to move the driver blade from the BDC position toward the TDC position. The lifter is configured to engage with the teeth of the driver blade when moving the driver blade from the BDC position to the TDC position. A latch assembly is movable between a latched state in which the driver blade is held in a ready position against a biasing force of compressed gas, and a released state in which the driver blade is permitted to be driven by the biasing force toward the BDC position. The latch assembly is configured to engage with the projections.

The present invention provides, in another aspect, a gas spring-powered fastener driver including a cylinder, a moveable piston positioned within the cylinder, and a driver blade attached to the piston and movable therewith between a top-dead-center (TDC) position and a driven or bottom-dead-center (BDC) position. The driver blade includes a body and a plurality of teeth extending therefrom. The driver blade defines a driving axis. The gas spring-powered fastener driver further includes a lifter operable to move the driver blade from the BDC position toward the TDC position. The lifter has a plurality of drive pins. At least one of the drive pins includes a roller bushing positioned on the at least one drive pin and configured to engage with one of the teeth of the driver blade when moving the driver blade from the BDC position toward the TDC position. Each one of the plurality of teeth includes a contact surface engageable with the roller bushing and/or one of the drive pins. The contact surface of each tooth defines an included angle with the driving axis that is greater than 90 degrees.

The present invention provides, in yet another aspect, a gas spring-powered fastener driver including a cylinder, a moveable piston positioned within the cylinder, and a driver blade attached to the piston and movable therewith between a top-dead-center (TDC) position and a driven or bottom-dead-center (BDC) position. The driver blade includes a body and a plurality of teeth extending therefrom. The body has a first hardness. At least one of the teeth has a second hardness that is greater than the first hardness.

The present invention provides, in yet still another aspect, a gas spring-powered fastener driver including a cylinder, a moveable piston positioned within the cylinder, and a driver blade attached to the piston and movable therewith between a top-dead-center (TDC) position and a driven or bottom-dead-center (BDC) position. The driver blade includes a body and a plurality of teeth extending therefrom. The driver blade defines a driving axis. The driver blade includes a body having a first side and an opposite, second side with the driving axis passing therebetween. A plurality of teeth extends from the first side of the body. The body and the teeth are bisected by a common plane. The gas spring-powered fastener driver further includes a lifter operable to move the driver blade from the BDC position toward the TDC position. The lifter is configured to engage with the teeth of the driver blade when moving the driver blade from the BDC position toward the TDC position. The gas spring-powered fastener driver further includes a nosepiece guide having a channel in which the driver blade is slidably received. The body has a first width in a direction perpendicular to the common plane. The teeth have a second width in a direction perpendicular to the common plane. The second width is different than the first width. The second width defines a plurality of guide surfaces that are spaced from the common plane and extend parallel to the driving axis. The plurality of guide surfaces is slidable against corresponding guide surfaces of the channel.

The present invention provides, in another aspect, a gas spring-powered fastener driver including a cylinder, a moveable piston positioned within the cylinder, and a driver blade attached to the piston and movable therewith between a top-dead-center (TDC) position and a driven or bottom-dead-center (BDC) position. The driver blade includes a body and a plurality of teeth extending therefrom. The driver blade defines a driving axis. The driver blade includes a body having a first side and an opposite, second side with the driving axis passing therebetween, and a plurality a plurality of projections extending from the second side of the body. The body and the projections are bisected by a common plane. The gas spring-powered fastener driver further includes a latch assembly movable between a latched state in which the driver blade is held in the ready position against a biasing force of compressed gas, and a released state in which the driver blade is permitted to be driven by the biasing force toward the driven position. The latch assembly includes a latch engageable with the plurality of projections. The gas spring-powered fastener driver further includes a nosepiece guide having a channel in which the driver blade is slidably received. The body has a first width in a direction perpendicular to the common plane. The projections have a second width in a direction perpendicular to the common plane. The second width is different than the first width. The second width defines a plurality of guide surfaces that are spaced from the common plane and extend parallel to the driving axis. The plurality of guide surfaces is slidable against corresponding guide surfaces of the channel.

The present invention provides, in yet another aspect, a gas spring-powered fastener driver including an outer cylinder, and an inner cylinder positioned within the outer cylinder. A moveable piston is positioned within the inner cylinder. A driver blade is attached to the piston and movable therewith between a top-dead-center (TDC) position and a driven or bottom-dead-center (BDC) position. A retaining member is secured to the inner cylinder. The retaining member couples the inner cylinder to the outer cylinder. The inner cylinder is axially secured to the outer cylinder relative to a driving axis defined by the driver blade. The outer cylinder is rotatable relative to the inner cylinder.

The present invention provides, in yet still another aspect, a gas spring-powered fastener driver including a cylinder, a moveable piston positioned within the cylinder, and a driver blade attached to the piston and movable therewith between a top-dead-center (TDC) position and a driven or bottom-dead-center (BDC) position. The gas spring-powered fastener driver further includes a lifter operable to move the driver blade from the BDC position toward the TDC position. A transmission is provided for providing torque to the lifter. A bumper is positioned in the cylinder and configured to absorb impact energy from the piston when the driver blade is driven toward the BDC position. A chamber is defined between the piston, the cylinder, and the bumper when the driver blade reaches the BDC position. A plurality of slots is defined by the cylinder. The slots fluidly connect the chamber to the outside atmosphere.

The present invention provides, in another aspect, a gas spring-powered fastener driver including a housing having a first portion and a second portion, and an outer cylinder supported by the first portion. The gas spring-powered fastener driver further includes an inner cylinder positioned within the outer cylinder, and a moveable piston positioned within the inner cylinder. The gas spring-powered fastener driver further includes a driver blade attached to the piston and movable therewith between a top-dead-center (TDC) position and a driven or bottom-dead-center (BDC) position. A lifter is operable to move the driver blade from the BDC position toward the TDC position. A motor and a transmission provides torque to the lifter. The motor and the transmission are supported by the second portion. A plurality of damping elements is positioned between the housing and at least one of the inner cylinder, the transmission, or the motor. The plurality of damping elements are positioned such that the at least one of the inner cylinder, the transmission, and the motor is mounted within the housing yet movable relative to the housing for damping forces exerted on the housing by the inner cylinder, the transmission, or the motor.

The present invention provides, in yet another aspect, a gas spring-powered fastener driver including a cylinder, a moveable piston positioned within the cylinder, a driver blade attached to the piston and movable therewith between a top-dead-center (TDC) position and a driven or bottom-dead-center (BDC) position. The driver blade is configured to be positioned at a ready position intermediate the TDC position and the BDC position. A lifter is operable to move the driver blade from the BDC position toward the TDC position. The lifter is supported by a lifter housing. The lifter includes a body rotatably supported about a rotational axis, and a plurality of drive pins engageable with the driver blade when moving the driver blade from the BDC position to the TDC position. A motor and a transmission is provided for providing torque to the lifter. A magnet is positioned at a predetermined location on the body of the lifter. The magnet is coupled for co-rotation with the body about the rotational axis. A sensor is positioned on the lifter housing. The sensor is configured to detect the magnet to stop the driver blade at the intermediate position. A horizontal plane extends through the rotational axis. When the driver blade is at the ready position, one of the drive pins is at a first angle relative to the horizontal plane. When the driver blade is at the TDC position, the one of the drive pins is at a second angle relative to the horizontal plane. The predetermined location of the magnet is selected based on a difference of the first angle and the second angle. The difference of the first angle and the second angle is between 7 degrees and 14 degrees.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
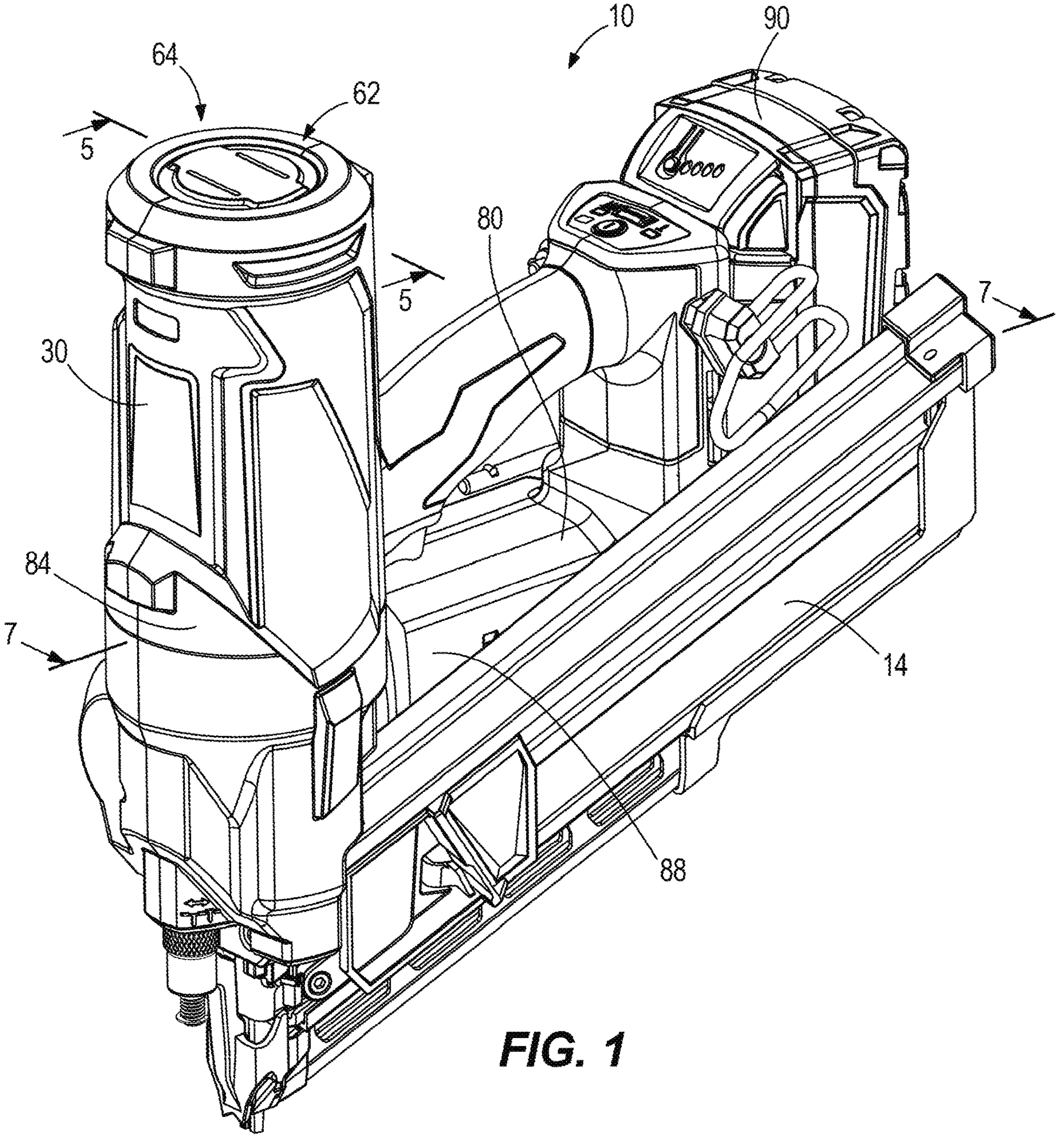
FIG. 1 is perspective view of a gas spring-powered fastener driver in accordance with an embodiment of the invention.
Figure 2:
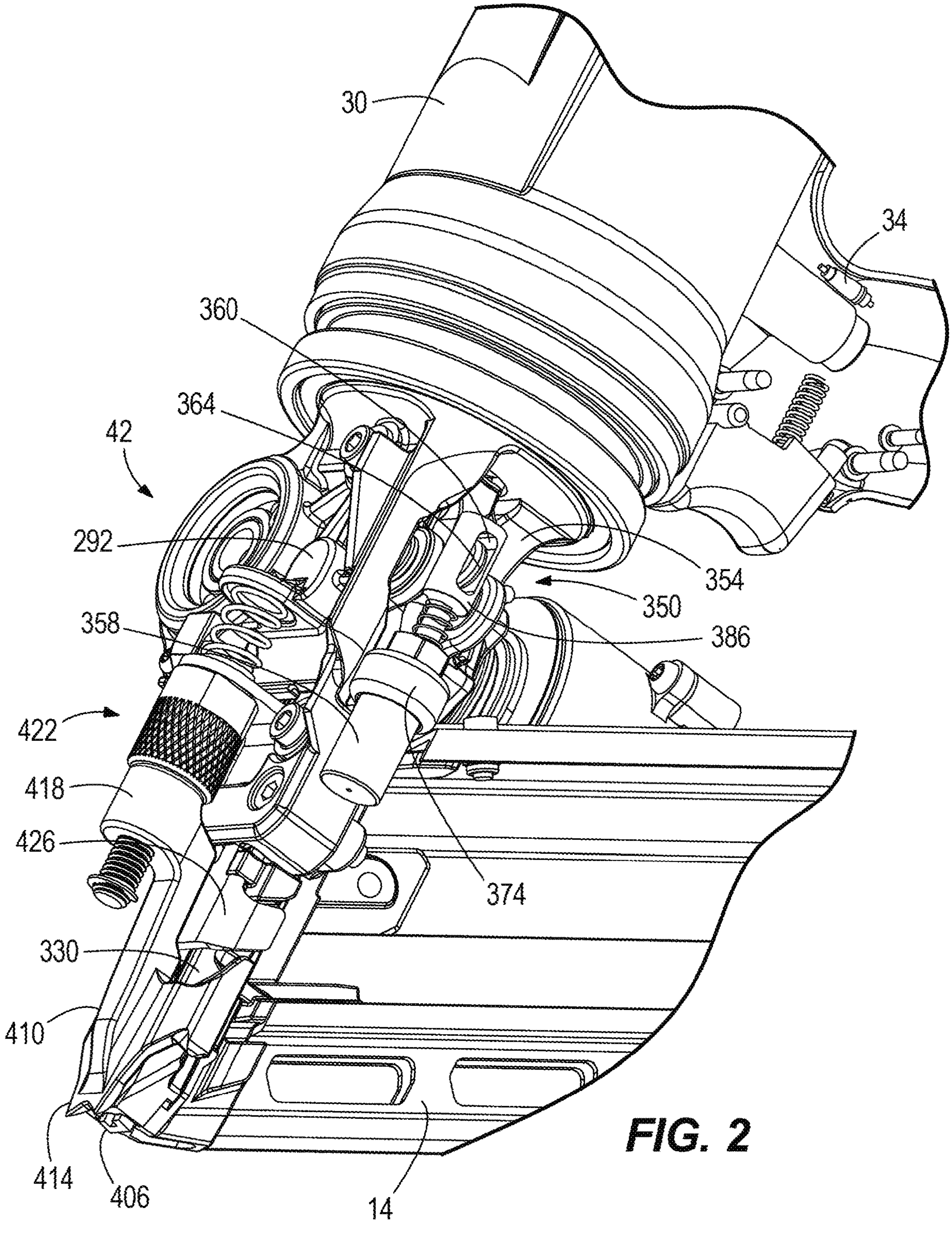
FIG. 2 is a partial cut-away view of the gas spring-powered fastener driver of FIG. 1.

With reference to FIGS. 1-4, a gas spring-powered fastener driver 10 is operable to drive fasteners (e.g., nails, tacks, staples, etc.) held within a magazine 14 into a workpiece. The fastener driver 10 includes an inner cylinder 18 and a moveable piston 22 positioned within the cylinder 18 (FIG. 5). With reference to FIG. 5, the fastener driver 10 further includes a driver blade 26 that is attached to the piston 22 and moveable therewith. The fastener driver 10 does not require an external source of air pressure, but rather includes an outer storage chamber cylinder 30 of pressurized gas in fluid communication with the cylinder 18. In the illustrated embodiment, the cylinder 18 and moveable piston 22 are positioned within the storage chamber cylinder 30. With reference to FIG. 2, the driver 10 further includes a fill valve 34 (shown exploded from the cylinder 30) coupled to the storage chamber cylinder 30. When connected with a source of compressed gas, the fill valve 34 permits the storage chamber cylinder 30 to be refilled with compressed gas if any prior leakage has occurred. The fill valve 34 may be configured as a Schrader valve, for example.

Figure 4:
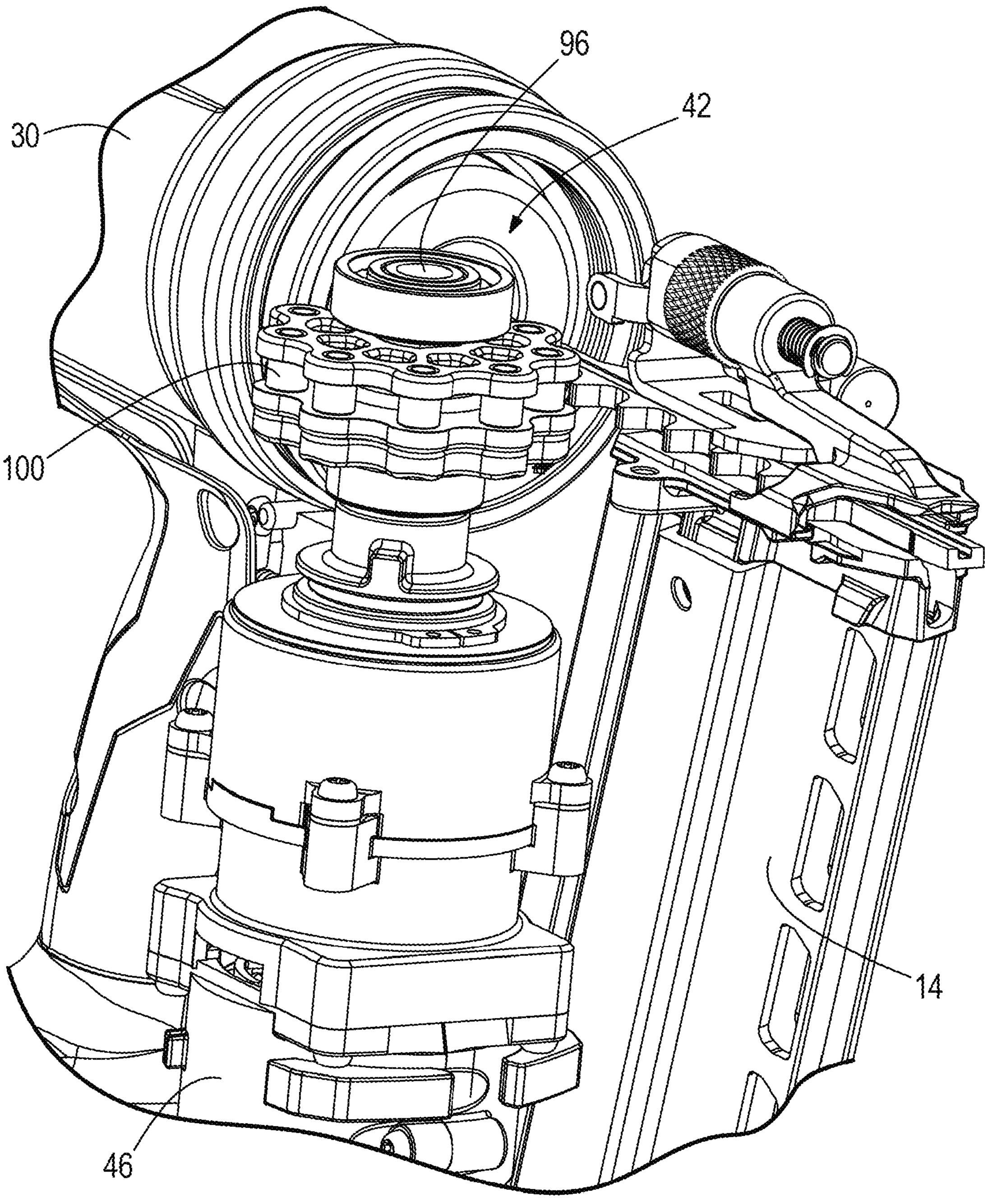
FIG. 4 is another partial cut-away view of the gas spring-powered fastener driver of FIG. 1, with portions removed for clarity.
Figure 5:
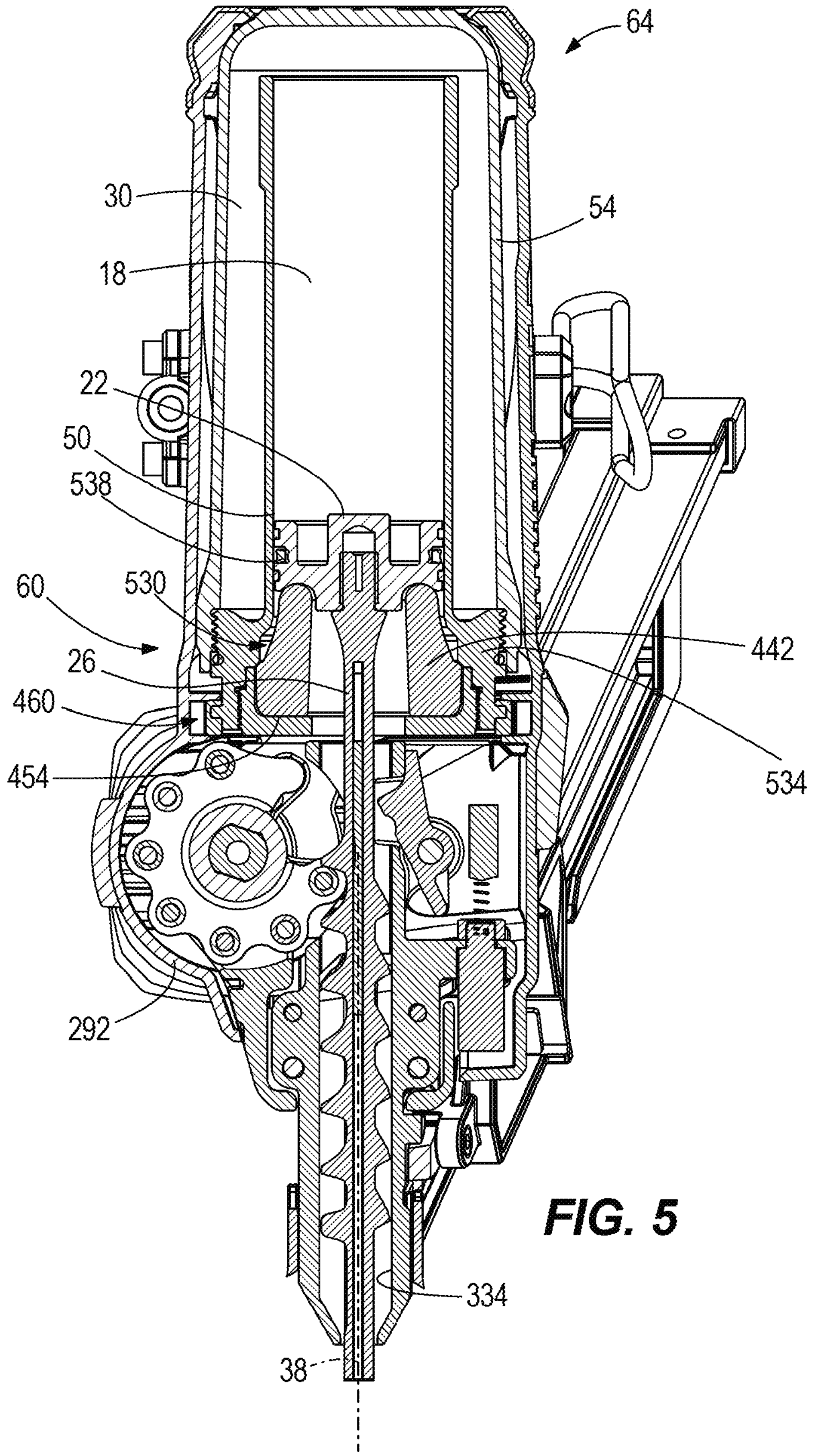
FIG. 5 is a partial cross-sectional view of the gas spring-powered fastener driver taken along line 5-5 in FIG. 1.
Figure 6A:
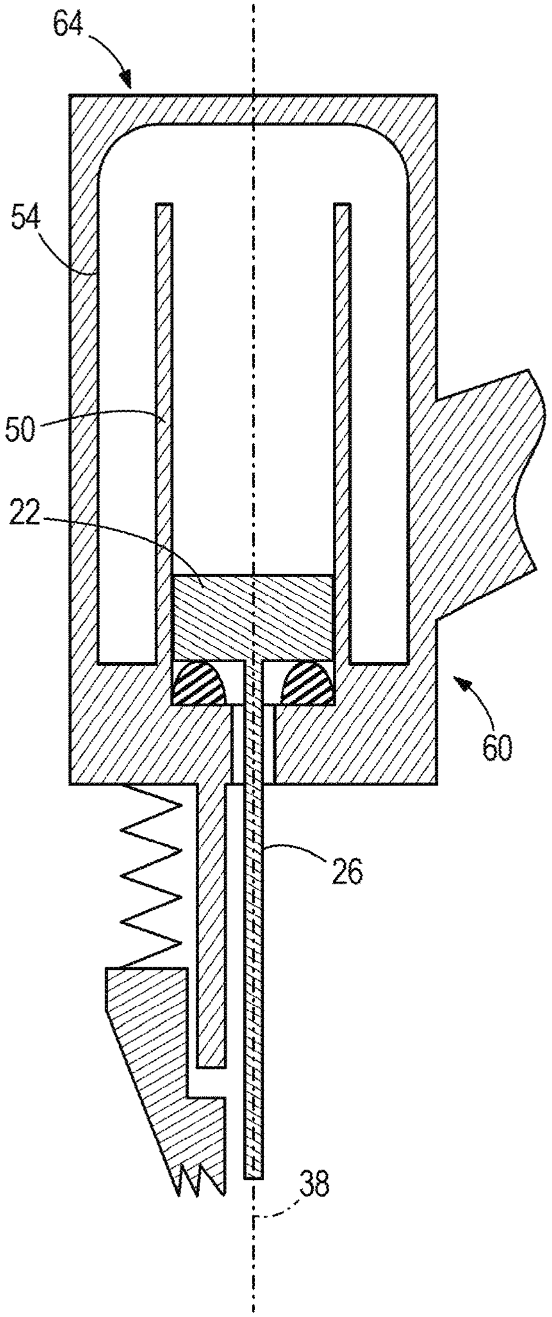
FIG. 6A is a schematic view of the gas spring-powered fastener driver of FIG. 1, illustrating a driver blade in a driven or bottom-dead-center position.
Figure 6B:
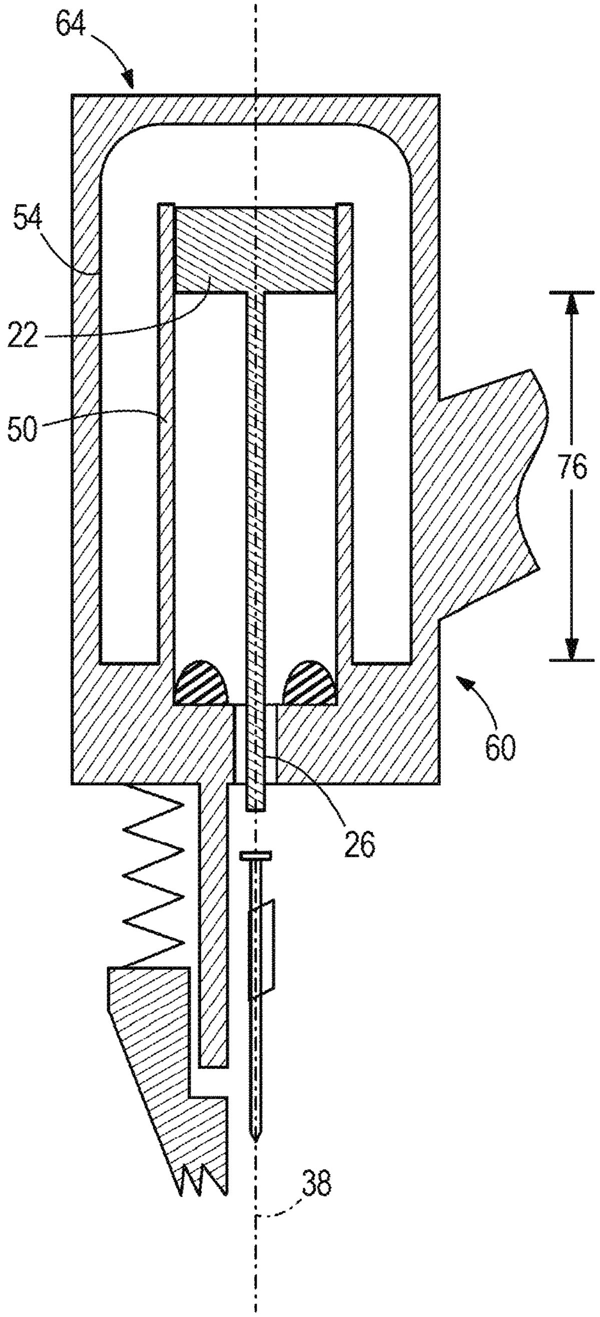
FIG. 6B is a schematic view of the gas spring-powered fastener driver of FIG. 1, illustrating a driver blade in a top-dead-center position prior to actuation.

With reference to FIGS. 4-6, the cylinder 18 and the driver blade 26 define a driving axis 38 (FIG. 5). During a driving cycle, the driver blade 26 and piston 22 are moveable between a top-dead-center (TDC) position (FIG. 6B) and a driven or bottom-dead-center (BDC) position (FIG. 6A). The fastener driver 10 further includes a lifting assembly 42 (FIG. 4), which is powered by a motor 46 (FIG. 4), and which is operable to move the driver blade 26 from the driven position to the TDC position.

Figure 3:
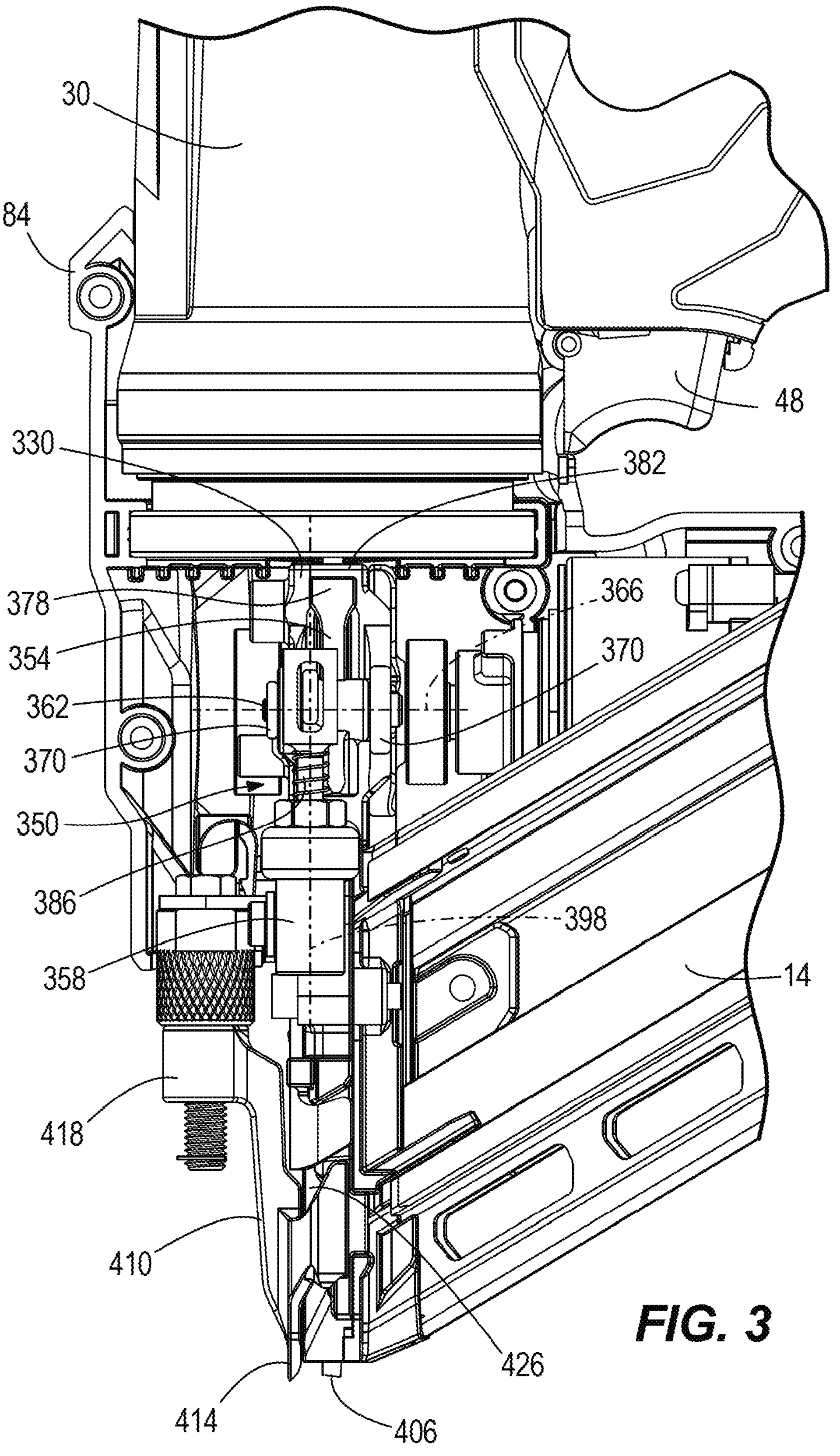
FIG. 3 is a partial cut-away view of the gas spring-powered fastener driver of FIG. 1, with portions removed for clarity.

In operation, the lifting assembly 42 drives the piston 22 and the driver blade 26 toward the TDC position by energizing the motor 46. As the piston 22 and the driver blade 26 are driven toward the TDC position, the gas above the piston 22 and the gas within the storage chamber cylinder 30 is compressed. Prior to reaching the TDC position, the motor 46 is deactivated and the piston 22 and the driver blade 26 are held in a ready position, which is located between the TDC and the BDC or driven positions, until being released by user activation of a trigger 48 (FIG. 3). When released, the compressed gas above the piston 22 and within the storage chamber cylinder 30 drives the piston 22 and the driver blade 26 to the driven position, thereby driving a fastener into the workpiece. The illustrated fastener driver 10 therefore operates on a gas spring principle utilizing the lifting assembly 42 and the piston 22 to further compress the gas within the cylinder 18 and the storage chamber cylinder 30. Further detail regarding the structure and operation of the fastener driver 10 is provided below.

With reference to FIGS. 5 and 6A-6B, the storage chamber cylinder 30 is concentric with the cylinder 18. The cylinder 18 has an annular inner wall 50 configured to guide the piston 22 and driver blade 26 along the driving axis 38 to compress the gas in the storage chamber cylinder 30. The storage chamber cylinder 30 has an annular outer wall 54 circumferentially surrounding the inner wall 50. The cylinder 18 has a threaded section 58 (FIG. 5). The storage chamber cylinder 30 has corresponding threads at a lower end 60 of the storage chamber cylinder 30 such that the cylinder 18 is threadably coupled to the storage chamber cylinder 30 at the lower end 60. As such, the cylinder 18 is configured to be axially secured to the storage chamber cylinder 30. The threaded coupling may facilitate and simplify assembly of the driver 10. Furthermore, the storage chamber cylinder 30 is rotatably movable relative to the cylinder 18 such that an indicia region 62 (FIG. 1) such as logos, images, brands, text, marks, and other indicia being displayed on a top end 64 of the storage chamber cylinder 30 can be aligned about the driving axis 38.

The storage chamber cylinder 30 and the cylinder 18 define a first total volume in which gas is located when the driver blade 26 is in the TDC position (FIG. 6B). The storage chamber cylinder 30 and the cylinder 18 define a second total volume, which is greater than the first total volume, in which gas is located when the driver blade 26 is in the driven position (FIG. 6A). A compression ratio is defined as the ratio of the second total volume to the first total volume. In one embodiment, the compression ratio is 1.7:1 or less. For example, in the illustrated embodiment, the compression ratio is 1.61:1. In another embodiment, the compression ratio is 1.6:1 or less. A lower compression ratio may reduce the force and/or stress on the driver 10 (i.e., the storage chamber cylinder 30, piston 22) which may prolong the useful life of the driver 10. In particular, when the piston 22 and the driver blade 26 is moved toward the TDC position, forces (from the lifting assembly 42 and the gas being compressed in the cylinder 18 and the storage chamber cylinder 30 by the piston 22) act on the driver blade 26. The forces are at a maximum as the piston 22 and the driver blade 26 reach the TDC position. As such, a lower compression ratio reduces the reaction force imparted by the lifting assembly 42 and/or stress on the driver blade 26 when located in the TDC position, thereby reducing wear on the driver blade 26 and prolonging the life of the driver 10.

In one embodiment, a force acting on the driver blade 26 when located in the TDC position is no more than 450 pound-force (lbf). In another embodiment, the force acting on the driver blade 26 when located in the TDC position is no more than 435 lbf. In yet another embodiment, the force acting on the driver blade 26 when located in the TDC position is about 433 lbf. In some embodiments, in addition to applying a maximum force of 450 lbf or less on the driver blade 26 when located in the TDC position, a minimum force of 85 lbf must be applied to the driver blade 26 when located in the TDC position. Similarly, a lower compression ratio may reduce force and/or stress on the driver blade 26 when located in the ready position. In one embodiment, a force acting on the driver blade 26 when located in the ready position is no more than 430 pound-force (lbf). In another embodiment, the force acting on the driver blade 26 when located in the ready position is no more than 415 lbf. In yet another embodiment, the force acting on the driver blade 26 when located in the ready position is about 410 lbf.

Although in some embodiments it is desirable to maintain the force acting on the driver blade 26 when located in the TDC position to be no more than 450 lbf, it is also desirable to maintain a relatively high average force on the driver blade 26 between its TDC and BDC positions to sufficiently drive fasteners into a workpiece. For example, in one embodiment, the average force on the driver blade 26 is between 302 lbf and 362 lbf, and the force acting on the driver blade 26 when located in the driven or BDC position is no less than 225 lbf. In another embodiment, the average force acting on the driver blade 26 is between 327 lbf and 337 lbf, and the force acting on the driver blade 26 when located in the driven or BDC position is no less than 250 lbf. In yet another embodiment, the average force on the driver blade 26 is about 332 lbf, and the force acting on the driver blade 26 when located in the driven or BDC position is about 252 lbf.

A stroke length 76 (FIG. 6B) of the piston 22/driver blade 26 is defined as the distance traveled by the piston 22/driver blade 26 between the TDC and driven positions (FIGS. 6B and 6A respectively). The stroke length 76 determines the applied pressure on the piston 22 when the piston 22 is at the TDC position. In the illustrated embodiment, the stroke length 76 is between 4.1 inches and 5.1 inches. In another embodiment, the stroke length 76 is between 4.4 inches and 4.8 inches. In yet another embodiment, the stroke length 76 is about 4.6 inches.

With reference to FIG. 6A, the storage chamber cylinder 30 has a first diameter D1. The cylinder 18 has a second diameter D2 that is less than the first diameter D1 of the storage chamber cylinder 30. In one embodiment, the second diameter D2 is about 1.732 inches. In conjunction with a stroke length 76 of the piston 22 of about 4.6 inches, the volume displaced by the piston 22 between the TDC and BDC positions of the driver blade 26 is about 10.8 cubic inches.

With the abovementioned ranges of stroke length 76 and the abovementioned ranges of average force applied to the driver blade 26 as it moves between its TDC and BDC positions, in some embodiments, the fastener driver 10 is capable of performing up to 120 Joules (J) of work upon a fastener during a fastener driving operation. Such impact energy is sufficient to drive nails of up to 3.5 inches in length into a workpiece during, for example, a framing operation. Furthermore, in some embodiments, the fastener driver 10 is capable of performing at least 15 J of work upon a fastener during a fastener driving operation.

A pressure of the storage chamber cylinder 30 changes based on the position of the driver blade 26 and the piston 22. For example, when the compression ratio is about 1.61:1 and the stroke length 76 is about 4.6 inches, the pressure of the storage chamber cylinder 30 is about 108 pounds per square inch (psi) when the piston 22/driver blade 26 are at the driven position and 174 psi when the piston 22/driver blade 26 are at the TDC position (i.e., when the gas in the storage chamber cylinder 30 is at 70 degrees Fahrenheit). In other embodiments, the pressure of the storage chamber cylinder 30 is between 98 psi and 118 psi when the piston 22/driver blade 26 are at the driven position, and between 164 psi and 184 psi when the piston 22/driver blade 26 are at the TDC position (i.e., when the gas in the storage chamber cylinder 30 is at 70 degrees Fahrenheit).

Figure 7:
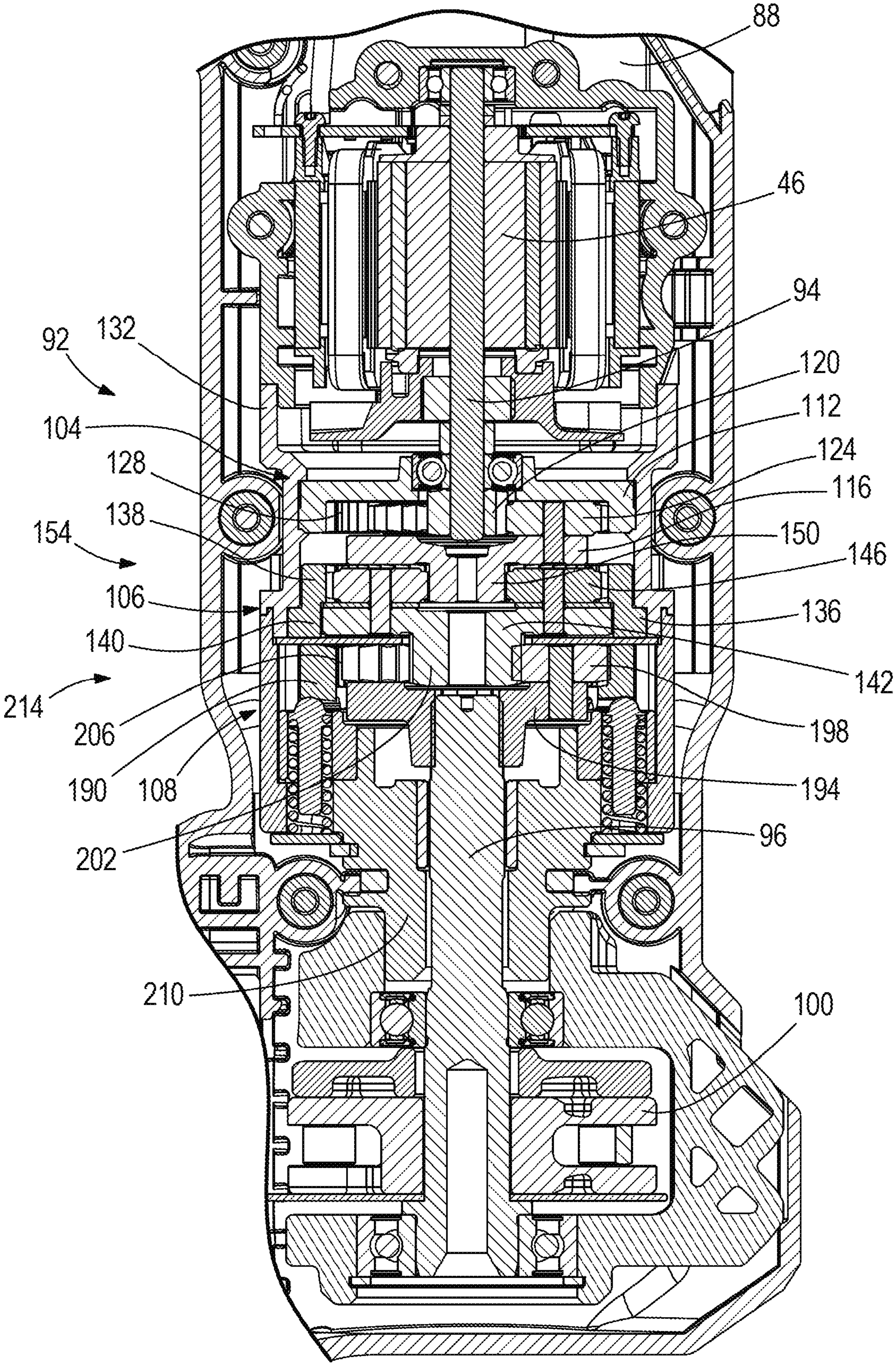
FIG. 7 is a cross-sectional view of the gas spring-powered fastener driver of FIG. 1 taken along line 7-7 in FIG. 1, illustrating a motor and a transmission for providing torque to a lifter.

With reference to FIG. 1, the driver 10 includes a housing 80 having a cylinder support portion 84 in which the storage chamber cylinder 30 is at least partially positioned and a motor support portion 88 in which the motor 46 and a transmission 92 are at least partially positioned. In the illustrated embodiment, the cylinder support portion 84 is integrally formed with the motor support portion 88 as a single piece (e.g., using a casting or molding process, depending on the material used). As described below in further detail, the transmission 92 which raises the driver blade 26 from the driven position to the ready position. With reference to FIG. 7, the motor 46 is positioned within the transmission housing portion 88 for providing torque to the transmission 92 when activated. A battery pack 90 (FIG. 1) is electrically connectable to the motor 46 for supplying electrical power to the motor 46. In alternative embodiments, the driver may be powered from an alternative power source such as an AC voltage input (i.e., from a wall outlet), or by an alternative DC voltage input (e.g., an AC/DC converter).

With reference to FIG. 7, the transmission 92 includes an input 94 (i.e., a motor output shaft) and includes an output shaft 96 extending to a lifter 100, which is operable to move the driver blade 26 from the driven position to the ready position, as explained in greater detail below. In other words, the transmission 92 provides torque to the lifter 100 from the motor 46. The transmission 92 is configured as a planetary transmission having first, second, and third planetary stages 104, 106, 108. In alternative embodiments, the transmission may be a single-stage planetary transmission, or a multi-stage planetary transmission including any number of planetary stages.

With continued reference to FIG. 7, the first planetary stage 104 includes a ring gear 112, a carrier 116, a sun gear 120, and multiple planet gears 124 coupled to the carrier 116 for relative rotation therewith. The sun gear 120 is drivingly coupled to the motor output shaft 94 and is enmeshed with the planet gears 124. The ring gear 112 includes a toothed interior peripheral portion 128. In the illustrated embodiment, the ring gear 112 in the first planetary stage 104 is fixed to a transmission housing 132 positioned adjacent the motor 46 such that it is prevented from rotating relative to the transmission housing 132. The plurality of planet gears 124 are rotatably supported upon the carrier 116 and are engageable with (i.e., enmeshed with) the toothed interior peripheral portion 128.

The second planetary stage 106 includes a ring gear 136, a carrier 142, and multiple planet gears 146 coupled to the carrier 142 for relative rotation therewith. The ring gear 136 includes a first toothed interior peripheral portion 138, and a second interior peripheral portion 140 adjacent the toothed interior peripheral portion 138. The carrier 116 of the first planetary stage 104 further includes an output pinion 150 that is enmeshed with the planet gears 146 which, in turn, are rotatably supported upon the carrier 142 of the second planetary stage 106 and enmeshed with the toothed interior peripheral portion 138 of the ring gear 136. Similar to the ring gear 112 of the first planetary stage 104, the ring gear 136 of the second planetary stage 106 is fixed relative to the transmission housing 132.

Figure 8:
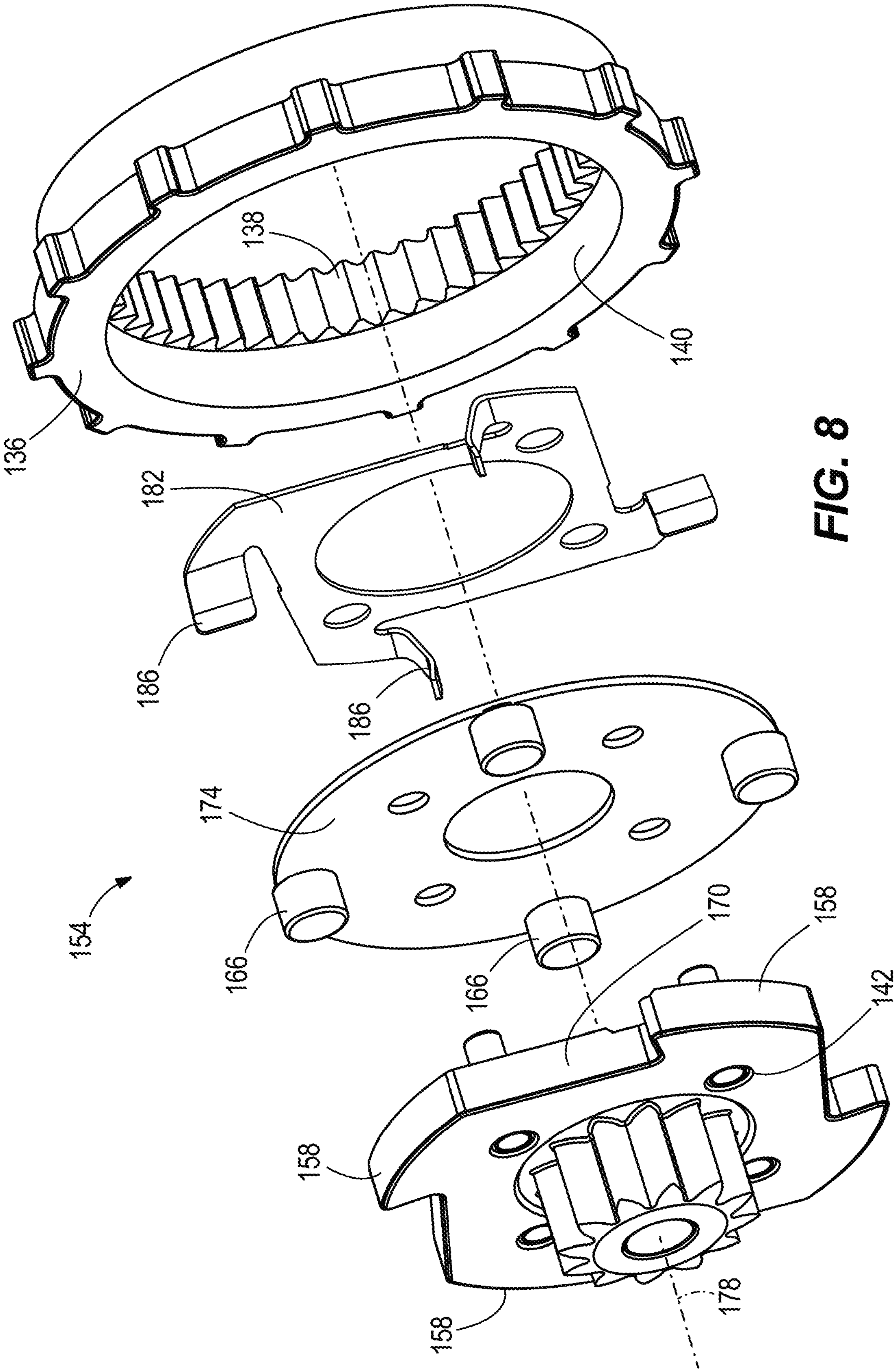
FIG. 8 is an exploded view of a one-way clutch mechanism of the transmission of FIG. 7.
Figure 9:
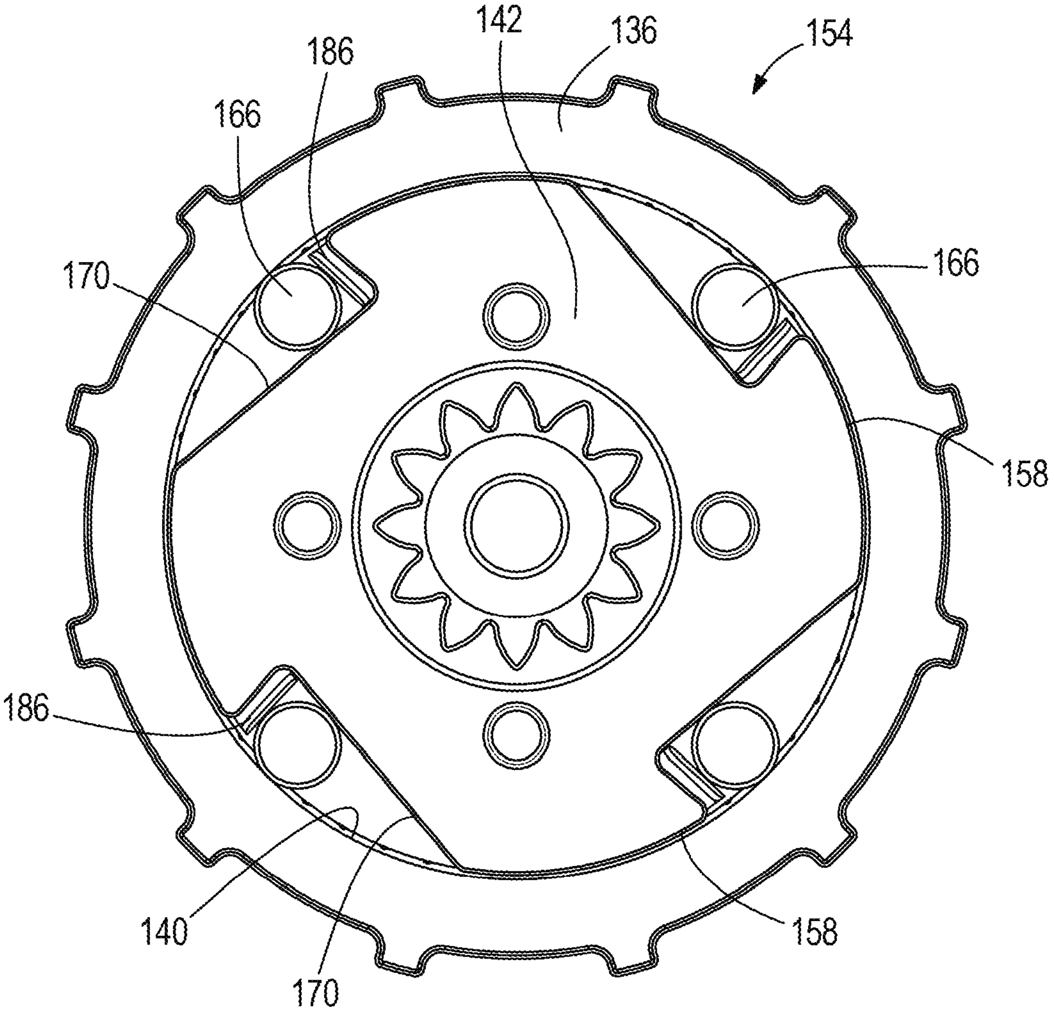
FIG. 9 is an assembled, cross-sectional view of the one-way clutch mechanism of FIG. 8.

With reference to FIGS. 7-9, the driver 10 further includes a one-way clutch mechanism 154 incorporated in the transmission 92. More specifically, the one-way clutch mechanism 154 includes the carrier 142, which is also a component in the third planetary stage 108. The one-way clutch mechanism 154 permits a transfer of torque to the output shaft 96 of the transmission 92 in a single (i.e., first) rotational direction (i.e., counter-clockwise from the frame of reference of FIG. 9), yet prevents the motor 46 from being driven in a reverse direction in response to an application of torque on the output shaft 96 of the transmission 92 in an opposite, second rotational direction (e.g., clockwise from the frame of reference of FIG. 9). In the illustrated embodiment, the one-way clutch mechanism 154 is incorporated with the second planetary stage 106 of the transmission 92. In alternative embodiments, the one-way clutch mechanism 154 may be incorporated into the first planetary stage 104, for example.

With continued references to FIGS. 7-9, the one-way clutch mechanism 154 also includes a plurality of lugs 158 (FIG. 8) defined on an outer periphery of the carrier 142. In addition, the one-way clutch mechanism 154 includes a plurality of rolling elements 166 engageable with the respective lugs 158, and a ramp 170 (FIG. 9) adjacent each of the lugs 158 along which the rolling element 166 is moveable. The illustrated rolling elements 166 extend from a disc 174. Each of the ramps 170 is inclined in a manner to displace the rolling elements 166 farther from a rotational axis 178 (FIG. 8) of the carrier 142 as the rolling elements 166 move further from the respective lugs 158. With reference to FIG. 7, the carrier 142 of the one-way clutch mechanism 154 is in the same planetary stage of the transmission 92 as the ring gear 136 (i.e., the second planetary stage 106). The rolling elements 166 are engageable with the second interior peripheral portion 140 of the ring gear 136 in response to an application of torque on the transmission output shaft 96 in the second rotational direction (i.e., as the rolling elements 166 move along the ramps 170 away from the respective lugs 158). A plate spring 182 is positioned adjacent the carrier 142. The plate spring 182 includes arms 186 for biasing the rolling elements 166 toward the second interior peripheral portion 140 (and away from the lugs 158).

In operation of the one-way clutch mechanism 154, the rolling elements 166 are maintained in close proximity with the respective lugs 158 in the first rotational direction (i.e., counter-clockwise from the frame of reference of FIG. 9) of the transmission output shaft 96. However, when the piston 22/driver blade 26 has reached the ready position, the rolling elements 166 move away from the respective lugs 158 in response to an application of torque on the transmission output shaft 96 in an opposite, second rotational direction (i.e., clockwise from the frame of reference of FIG. 9). More specifically, when the transmission output shaft 96 rotates a small amount (e.g., 1 degree) in the second rotational direction, the rolling elements 166 roll away from the respective lugs 158 along the ramps 170, and engage the second interior peripheral portion 140 on the ring gear 136 to thereby prevent further rotation of the transmission output shaft 96 in the second rotational direction. The corresponding arms 186 of the plate spring 182 exert an additional force on the roller elements 166 to maintain the rolling elements 166 against the second interior peripheral portion 140 of the ring gear 136, where they jam or wedge against the second interior peripheral portion 140. Consequently, the one-way clutch mechanism 154 prevents the transmission 92 from applying torque to the motor 46, which might otherwise back-drive or cause the motor 46 to rotate in a reverse direction, in response to an application of torque on the transmission output shaft 96 in an opposite, second rotational direction (i.e., when the piston 22 and the driver blade 26 has reached the ready position).

With reference to FIG. 7, the third planetary stage 108 includes a ring gear 190, a carrier 194, and multiple planet gears 198 coupled to the carrier 194 for relative rotation therewith. The carrier 142 of the second planetary stage 106 further includes an output pinion 202 that is enmeshed with the planet gears 198 which, in turn, are rotatably supported upon the carrier 194 of the third planetary stage 108 and enmeshed with a toothed interior peripheral portion 206 of the ring gear 190. Unlike the ring gears 112, 136 of the first and second planetary stages 104, 106, the ring gear 190 of the third planetary stage 108 is rotatable relative to a transmission cover 210 adjacent the transmission housing 132. The carrier 194 is coupled to the output shaft 96 for relative rotation therewith.

Figure 10:
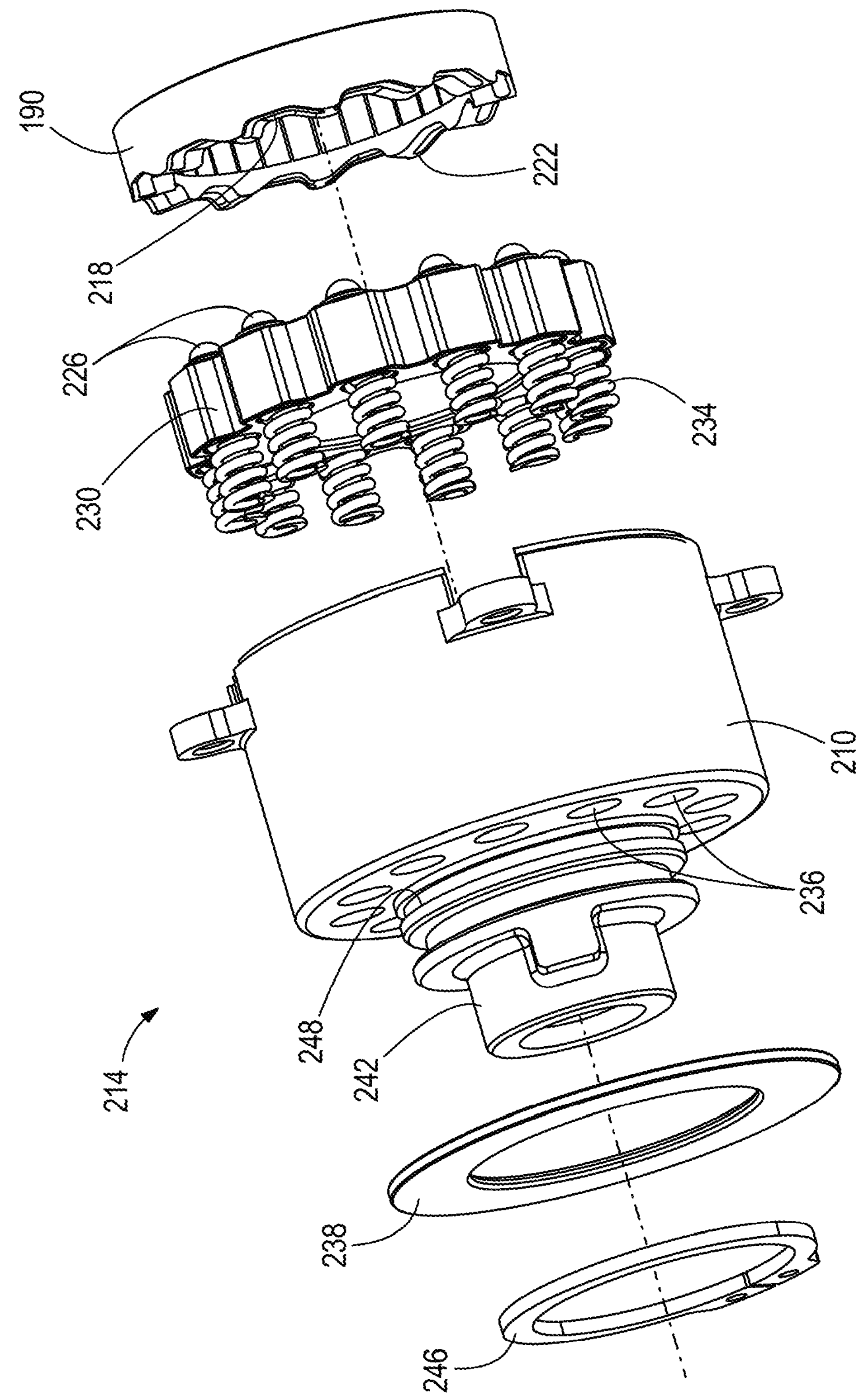
FIG. 10 is an exploded view of a torque-limiting clutch mechanism of the transmission of FIG. 7.
Figure 11:
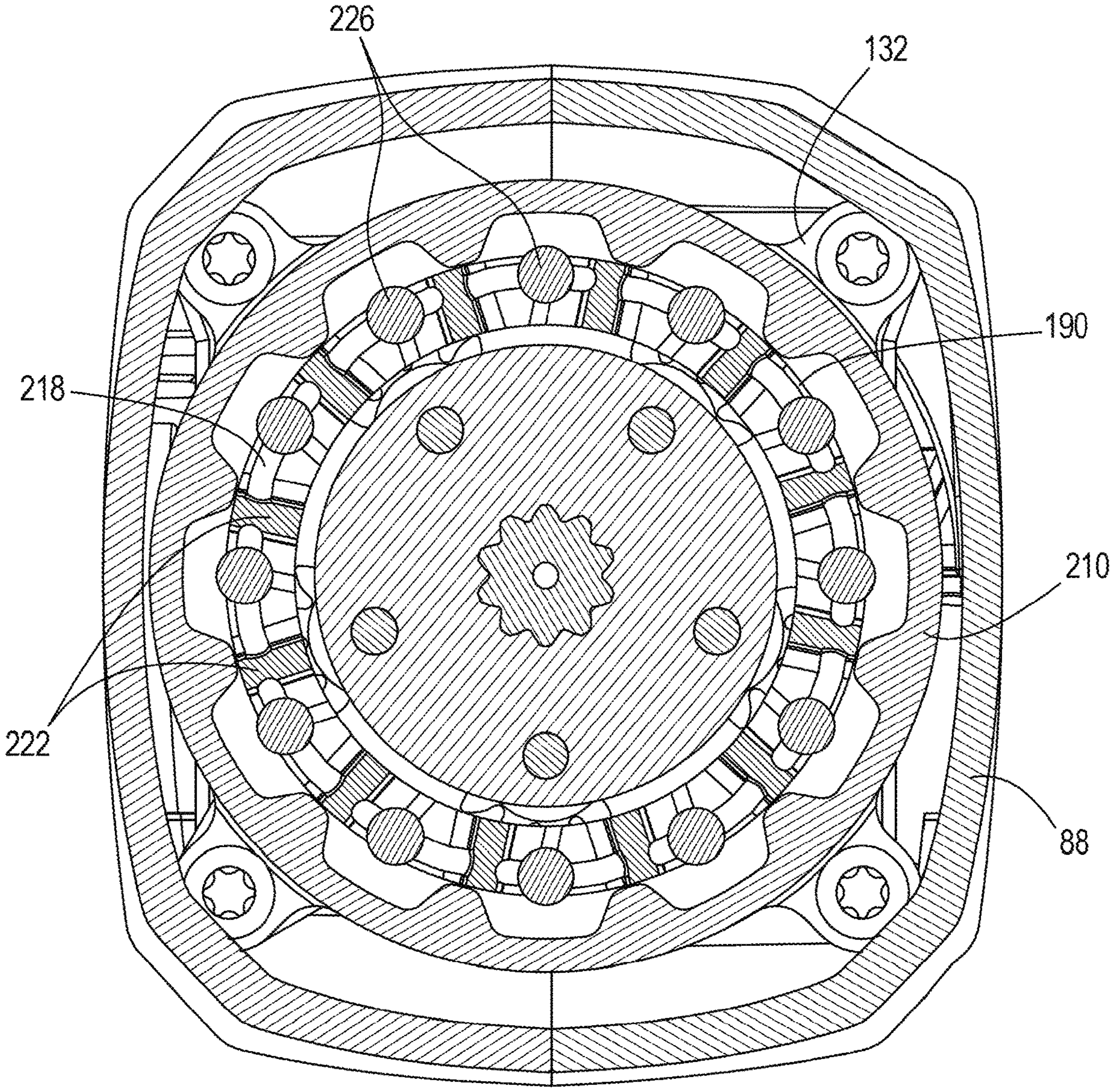
FIG. 11 is an assembled, partial cross-sectional view of the torque-limiting clutch mechanism of FIG. 10, with portions of the gas spring-powered fastener driver of FIG. 1 added for clarity.

With reference to FIGS. 7, 10, and 11, the driver 10 further includes a torque-limiting clutch mechanism 214 incorporated in the transmission 92. More specifically, the torque-limiting clutch mechanism 214 includes the ring gear 190, which is also a component of the third planetary stage 108. The torque-limiting clutch mechanism 214 limits an amount of torque transferred to the transmission output shaft 96 and the lifter 100. In the illustrated embodiment, the torque-limiting clutch mechanism 214 is incorporated with the third planetary stage 108 of the transmission 92 (i.e., the last of the planetary transmission stages), and the one-way and torque-limiting clutch mechanisms 154, 214 are coaxial (i.e., aligned with the rotational axis 178).

With references to FIGS. 10 and 11, the ring gear 190 of the torque-limiting clutch mechanism 214 includes an annular front end 218 having a plurality of lugs 222 defined thereon. The torque-limiting clutch mechanism 214 further includes a plurality of detent members 226 supported within a collar 230 fixed to the cover 210. The detent members 226 are engageable with the respective lugs 222 to inhibit rotation of the ring gear 190, and the torque-limiting clutch mechanism 214 further includes a plurality of springs 234 for biasing the detent members 226 toward the annular front end 218 of the ring gear 190. The springs 234 are seated within respective cylindrical pockets 236 in the cover 210 between the collar 230 and a disc 238. The disc 238 is positioned outside the cover 210 and circumferentially surrounds a section 242 of the cover 210. A retaining ring 246 axially secures the disc 238 to the cover 210. In response to a reaction torque applied to the transmission output shaft 96 that is above a predetermined threshold, torque from the motor 46 is diverted from the transmission output shaft 96 to the ring gear 190, causing the ring gear 190 to rotate and the detent members 226 to slide over the lugs 222.

With continued reference to FIGS. 7, 10, and 11, the gears (i.e., the first, second, and third planetary stages 104, 106, 108) may be assembled from the front of the transmission housing 132, and the torque-limiting clutch mechanism 214 may be inserted through a rear of the cover 210 adjacent the transmission housing 132. Then, the detent members 226 and the springs 234 may be inserted through the respective cylindrical pockets 236 at the front of the collar 230, and the disc 238 is positioned against the springs 234 for pre-loading the springs 234. Subsequently, the retaining ring 246 is positioned within a circumferential groove 248 in the cover section 242 and against the disc 238 to axially secure the disc 238. This may simplify assembly of the transmission 92, reduce required assembly time, and lower cost of parts.

Figure 24:
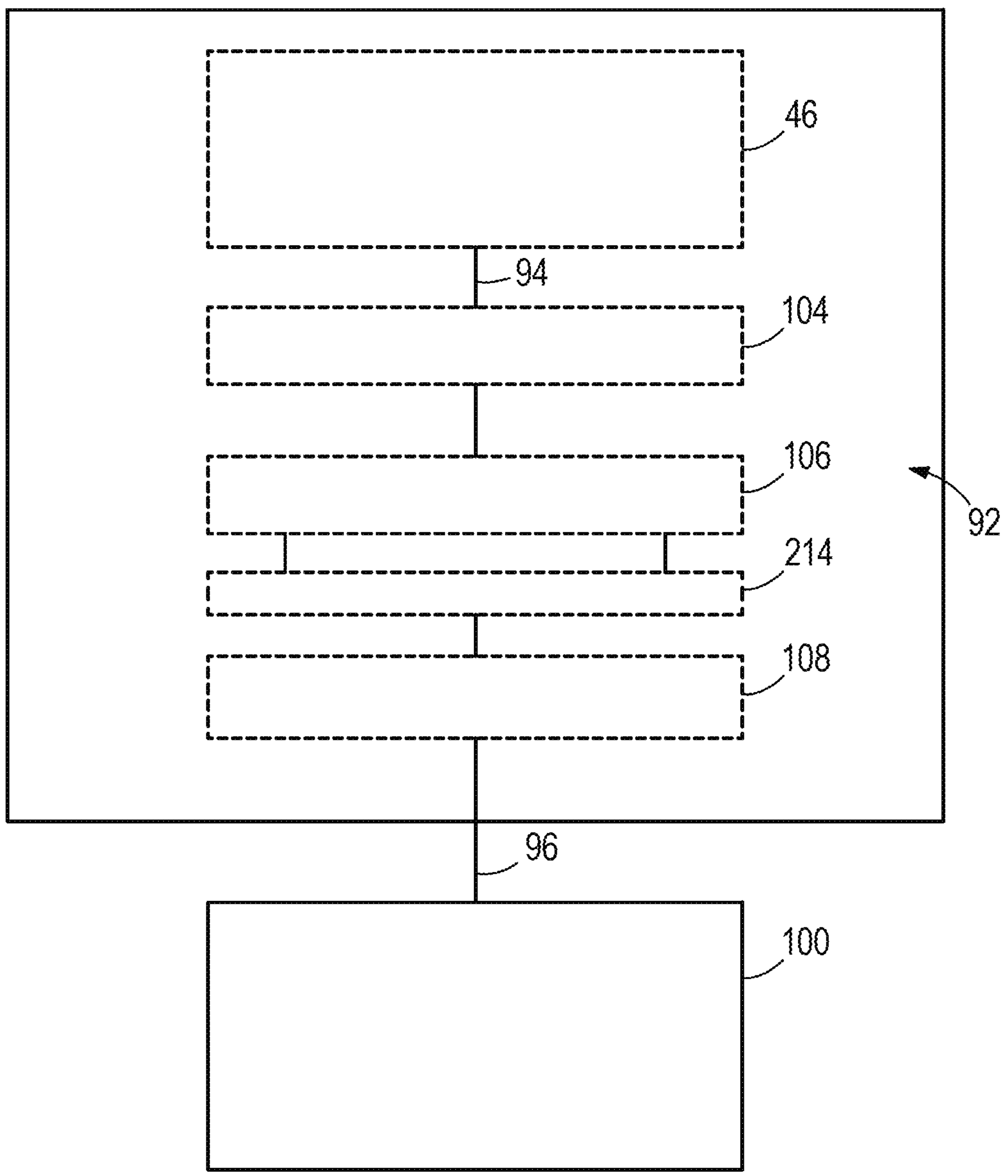
FIG. 24 is a schematic view of another embodiment of a motor and a transmission embodying the invention, illustrating an alternative position of the torque-limiting clutch mechanism of FIG. 10.

FIG. 24 illustrates a schematic view of the motor 46 and the transmission 92 of FIG. 7 in which the transmission 92 includes an alternative position of the torque-limiting clutch mechanism 214. In particular, instead of the torque-limiting clutch mechanism 214 integrated with the ring gear 190 of the third planetary stage 108, the torque-limiting clutch mechanism 214 is integrated with the second planetary stage 106 (including the second-stage ring gear 136). Because the second planetary stage 106 outputs a lower torque than the third planetary stage 108, a pre-loading force of the springs 234 of the torque-limiting clutch mechanism 214 may be reduced, thus reducing the force or load applied to the transmission 92 and the likelihood that the transmission 92 would break under the applied load.

Figure 12:
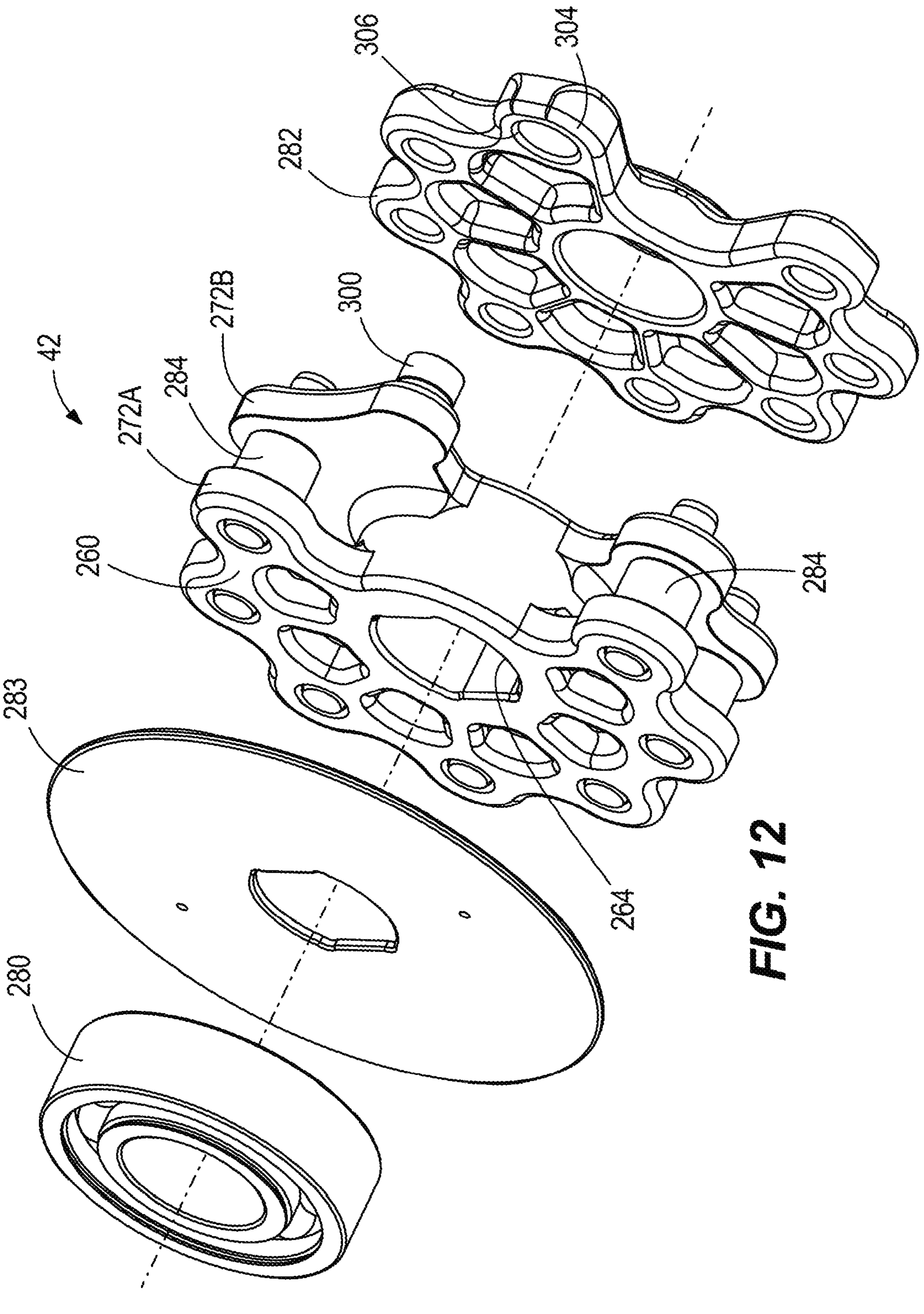
FIG. 12 is an exploded view of the lifter of FIG. 7.

With reference to FIGS. 4 and 12, the lifter 100, which is a component of the lifting assembly 42, is coupled for co-rotation with the transmission output shaft 96 which, in turn, is coupled for co-rotation with the third-stage carrier 194 by a spline-fit arrangement (FIG. 11). The lifter 100 includes a hub 260 having an opening 264. An end of the transmission output shaft 96 extends through the opening 264 and is rotatably secured to the lifter 100. With continued reference to FIG. 12, the hub 260 is formed by two plates 272A, 272B, and includes multiple drive pins 276 (FIG. 13) extending between the plates 272A, 272B. The illustrated lifter 100 includes seven drive pins 276; however, in other embodiments, the lifter 100 may include three or more drive pins 276. The drive pins 276 are sequentially engageable with the driver blade 26 to raise the driver blade 26 from the driven position to the ready position. The lifter assembly 42 further includes a bearing 280 positioned proximate the upper plate 272A. The bearing 280 is configured to rotatably support the transmission output shaft 96.

The illustrated lifter 100 further includes a disk member 282 positioned adjacent the lower plate 272B (FIG. 12). The disk member 282 is coupled for co-rotation with the transmission output shaft 96 and the lifter 100. The disk member 282 supports a magnet 300 positioned within a bore 306 defined by an outer peripheral portion 304 of the disk member 282, as further discussed below. Specifically, the disk member 282 may be considered a retaining member for inhibiting axial movement of the drive pins 276 and the magnet 300 relative to the rotational axis 178 (i.e., to the right from the frame of reference of FIG. 12). The lifter 100 further includes a second retaining member 283. The second retaining member 283 is positioned between the bearing 280 and a top surface of the upper plate 272A of the hub 260. More specifically, the second retaining member 283 is adjacent the top surface (i.e., positioned to the left from the frame of reference of FIG. 12). In the illustrated embodiment, the second retaining member 283 is a washer. In other embodiments, the second retaining member 283 may be a plate member, a disk member, etc. The second retaining member 283 is configured to inhibit axial movement of the drive pins 276 relative to the rotational axis 178 (i.e., to the left from the frame of reference of FIG. 12).

With reference to FIG. 12, the lifter 100 further includes roller bushings 284 positioned on each of the drive pins 276. The roller bushings 284 are configured to facilitate rolling motion between the drive pins 276 and the driver blade 26 when raising the driver blade 26 from the driven portion to the ready position. This may reduce wear on the driver blade 26 (i.e., teeth) and/or the lifter 100 which may increase the life of the driver 10.

Figure 13:
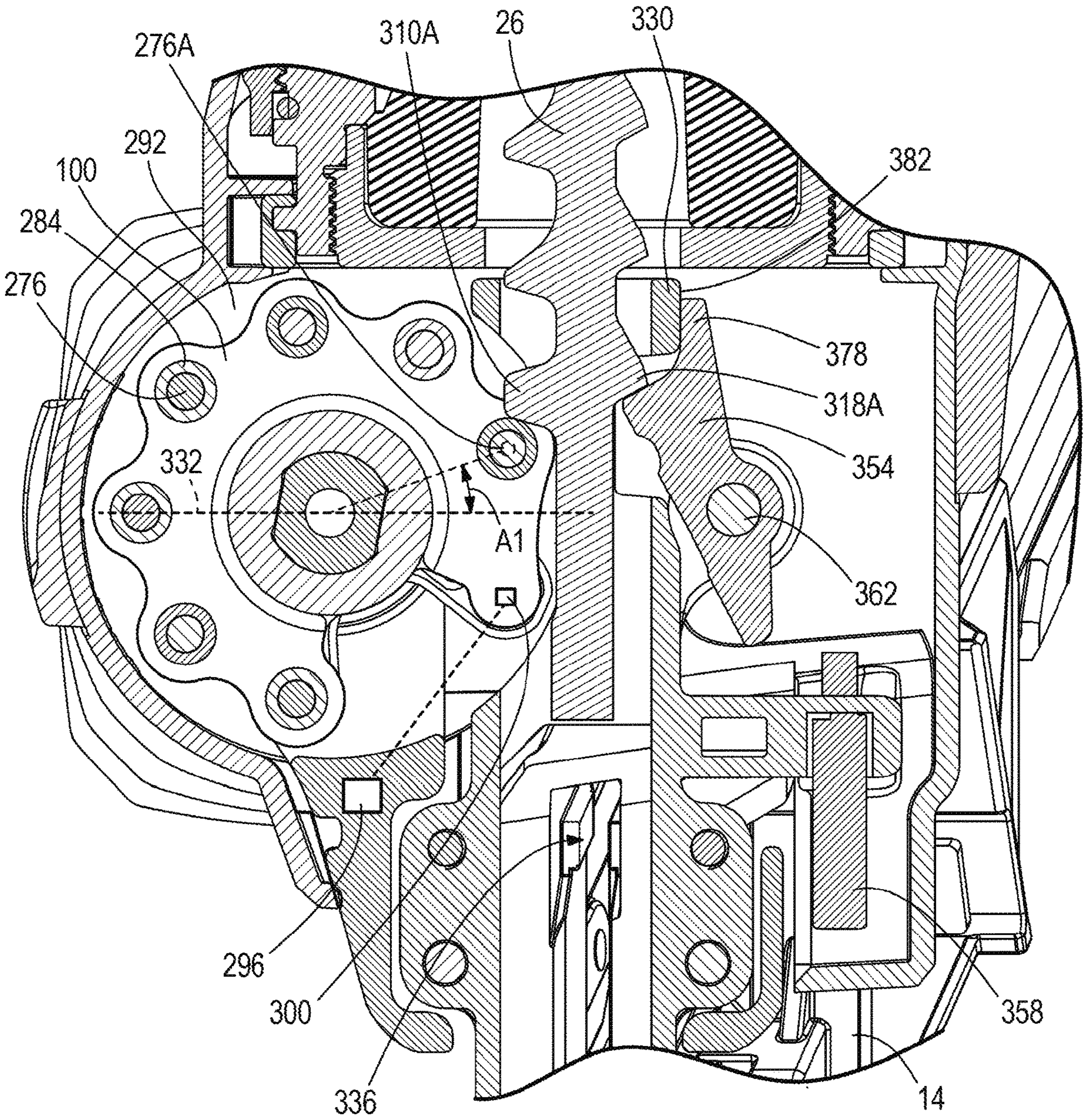
FIG. 13 is an enlarged view of the gas spring-powered fastener driver of FIG. 5, illustrating the driver blade in a ready position and a latch in a latched state.
Figure 14:
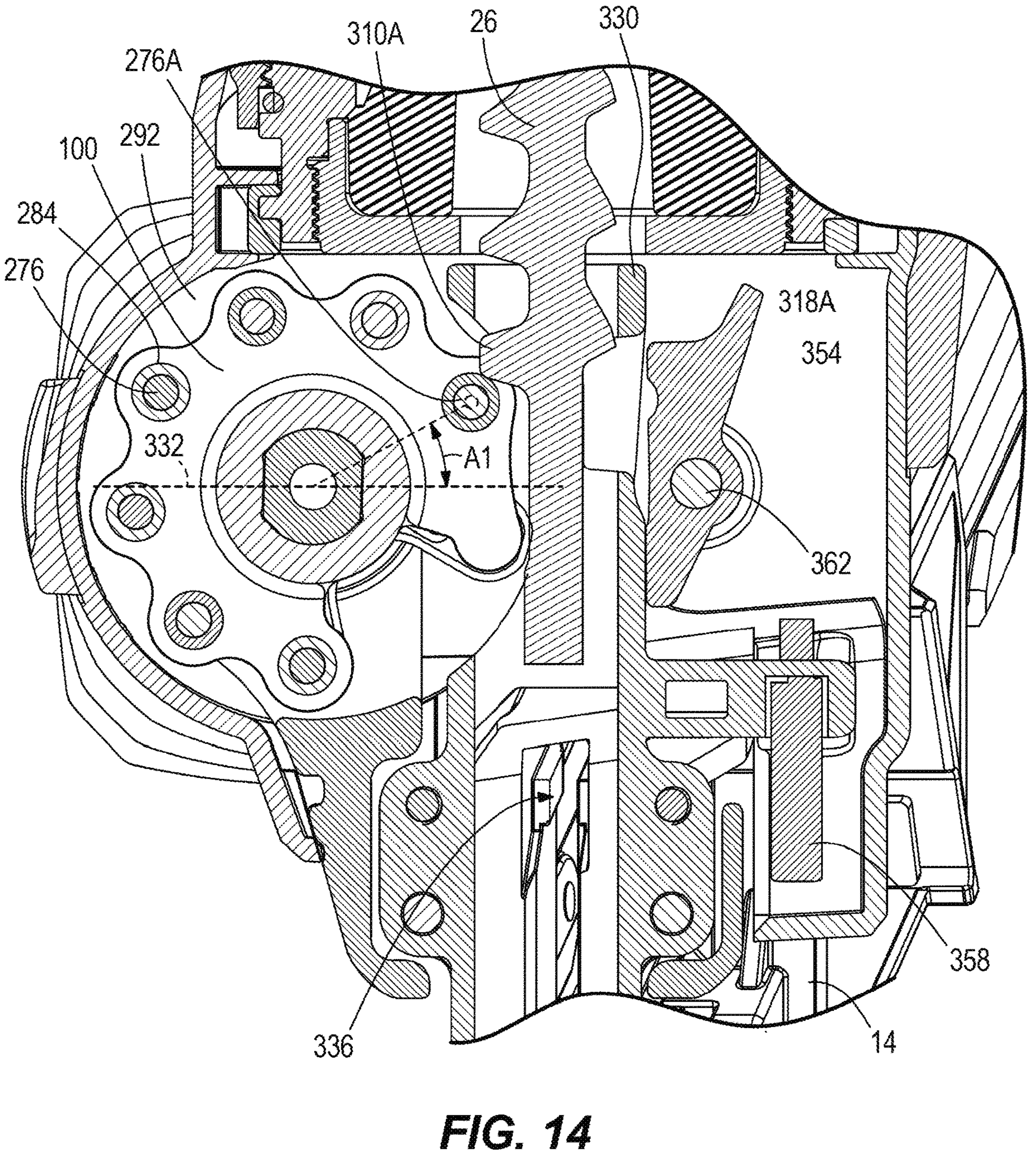
FIG. 14 is an enlarged view of the gas spring-powered fastener driver of FIG. 5, illustrating the driver blade in the top-dead-center position and the latch in a released state.

With reference to FIGS. 2 and 13-14, the driver 10 further includes a lifter housing portion 292 positioned adjacent the storage chamber cylinder 30 (FIG. 2). The lifter housing portion 292 substantially encloses the lifter assembly 42. Furthermore, the lifter housing portion 292 includes a sensor 296 (e.g., a Hall-effect sensor) positioned at a location proximate the lifter 100 (FIG. 13). As discussed above, the lifter 100 includes the magnet 300 supported by the disk member 282. The sensor 296 and the magnet 300 are configured to indicate a position of the driver blade 26 (i.e., the ready position), as further discussed below.

Figure 15A:
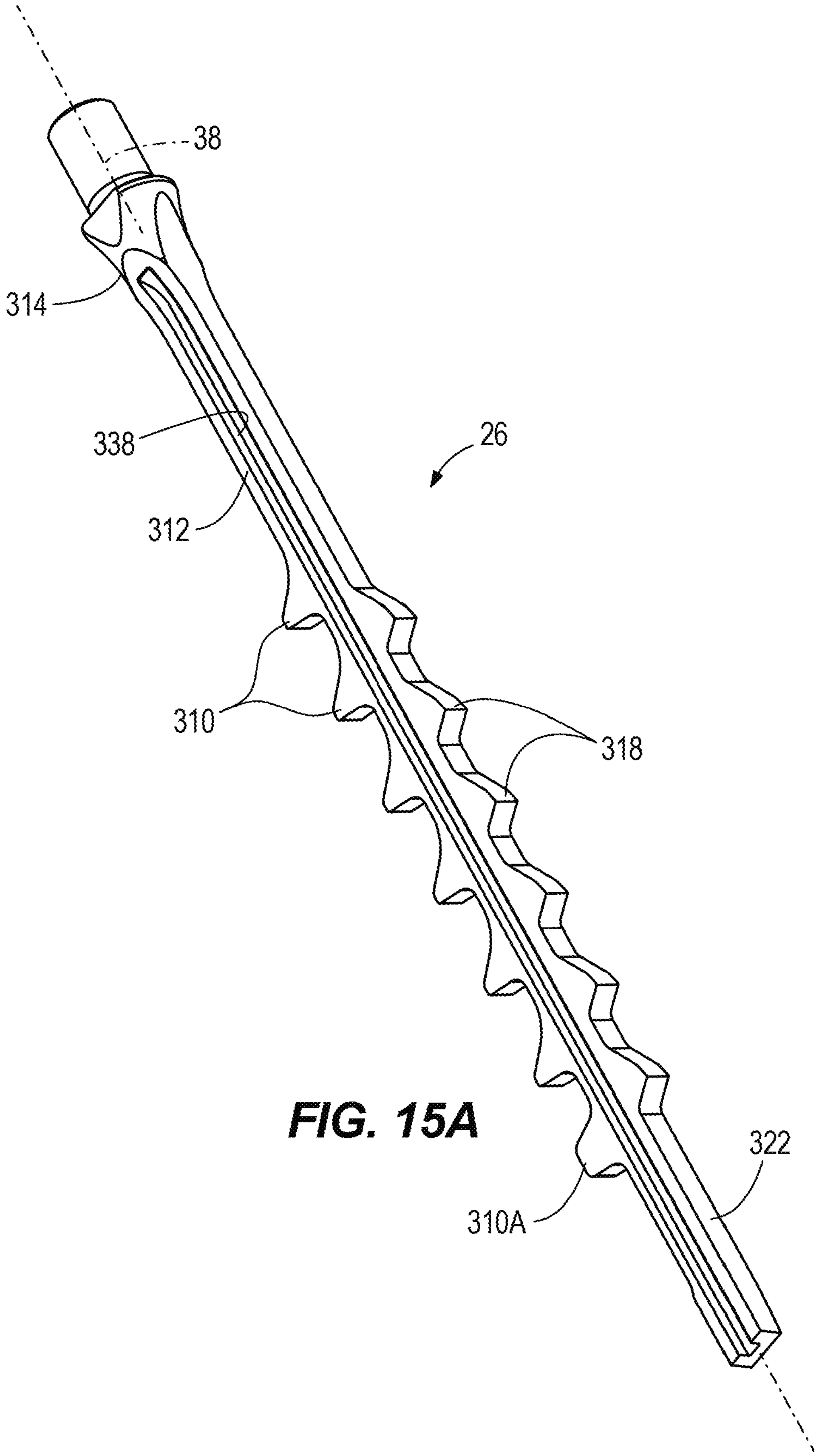
FIG. 15A is a perspective view of the driver blade.
Figure 15B:
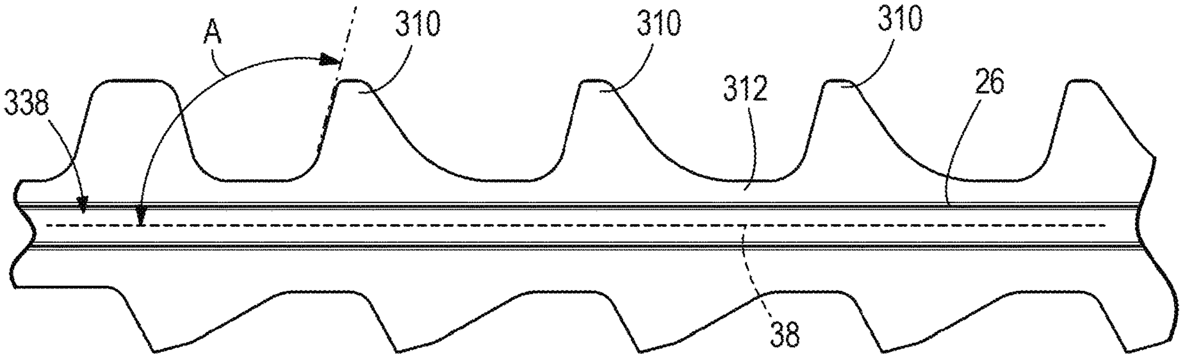
FIG. 15B is an enlarged plan view of the driver blade of FIG. 15A.

With reference to FIGS. 4, 15A, and 15B, the driver blade 26 includes teeth 310 along the length thereof, and the respective roller bushings 284 are engageable with the teeth 310 when returning the driver blade 26 from the driven position to the ready position. With reference to FIG. 15A, the teeth 310 extend from a first side 314 of an elongated body 312 of the driver blade 26 in a non-perpendicular direction relative to the driving axis 38 defined by the driver blade 26. For example, the illustrated teeth 310 extend in a direction at an angle A of about 115 degrees relative to the driving axis 38 (FIG. 15B). In other embodiments, the angle A may be between about 105 degrees and 125 degrees. Still further, in other embodiments, the angle A may be between about 110 degrees and 120 degrees. The non-perpendicular direction that the teeth 310 extend may facilitate contact between the roller bushings 284. This may reduce stress applied to the teeth 310, thereby prolonging the life of the driver 10. The illustrated driver blade 26 includes eight teeth 310 such that two revolutions of the lifter 100 moves the driver blade 26 from the driven position to the ready position. Furthermore, because the roller bushings 284 are capable of rotating relative to the respective drive pins 276, sliding movement between the roller bushings 284 and the teeth 310 is inhibited when the lifter 100 is moving the driver blade 26 from the driven position to the ready position. As a result, friction and attendant wear on the teeth 310 that might otherwise result from sliding movement between the drive pins 276 and the teeth 310 is reduced.

Figure 16:
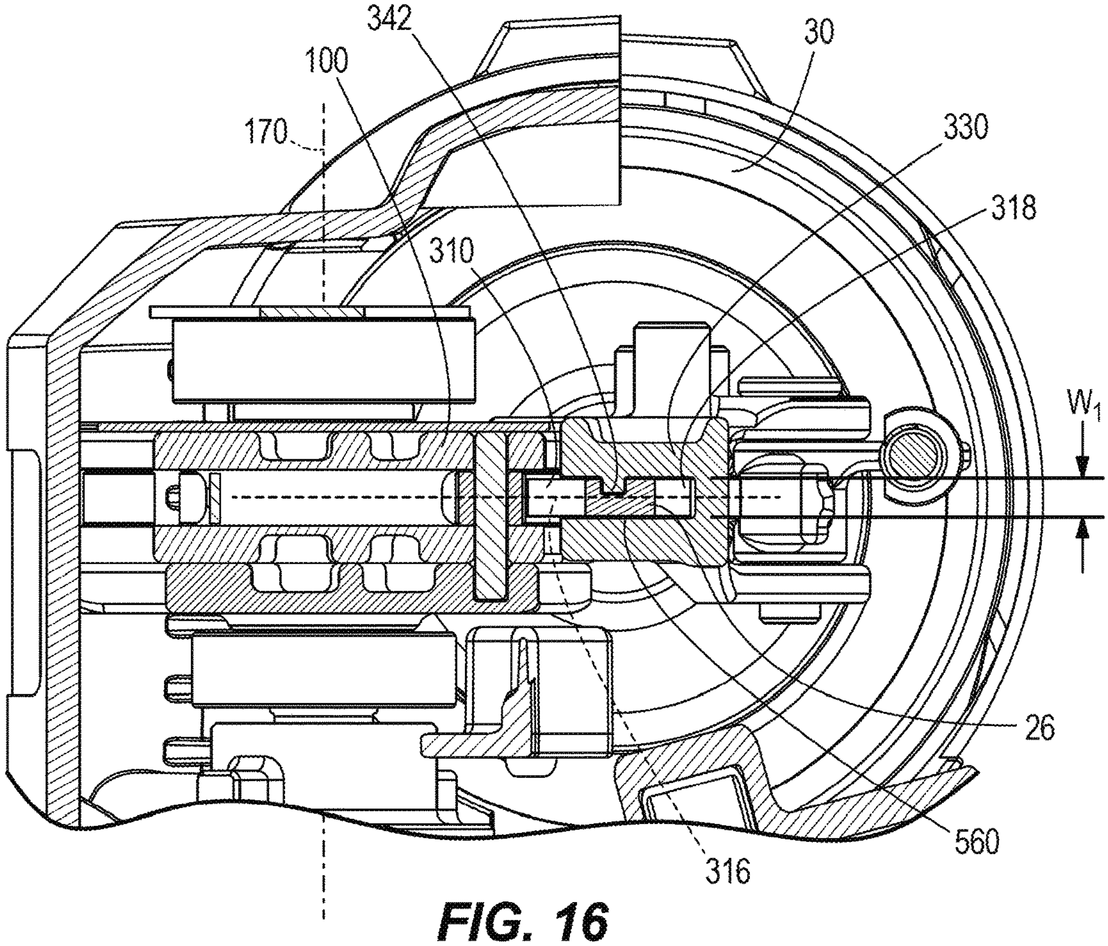
FIG. 16 is a bottom view of the fastener driver of FIG. 1, illustrating the driver blade supported within a nosepiece guide.

The driver blade 26 further includes axially spaced projections 318, the purpose of which is described below, formed on a second side 322 of the body 312 opposite the teeth 310 (FIG. 15A). The illustrated driver blade 26 is manufactured such that the body 312, each of the teeth 310, and each of the projections 318 are bisected by a common plane 316 (FIG. 16). This may simplify manufacturing of the driver blade 26, and reduce the stresses applied to the driver blade 26 (i.e., the teeth 310, the projection 318, etc.).

With reference to FIGS. 2, 5, and 13-14, the driver 10 further includes a nosepiece guide 330 positioned at an end of the magazine 14. The nosepiece guide 330 forms a firing channel 334 (FIG. 5) in communication with a fastener channel 336 in the magazine 14 (FIGS. 13-14). The firing channel 334 is configured to consecutively receive fasteners from a collated fastener strip within the fastener channel 336 of the magazine 14. As stated above, the lifter assembly 42 moves the driver blade 26 from the driven position to the ready position. The sensor 296 determines the position of the driver blade 26 in response to detecting the magnet 300, which is positioned on the disk member 282 and which co-rotates with the lifter 100. Specifically, the magnet 300 is aligned with the sensor 296 when the driver blade 26 reaches the ready position, deactivating the motor 46 in response to an output from the sensor 296 to stop the driver blade 26 at the ready position (FIG. 13). In the ready position of the driver blade 26, the driver blade 26 is positioned above the fastener channel 336 such that the fastener may be received within the firing channel 334 prior to initiation of a firing cycle. For example, in the illustrated embodiment, the driver blade 26 is positioned about 0.63 inches above the fastener channel 336. This may allow a sufficient amount of time to load the subsequent fastener and reduce the probability of jamming of the driver 10.

With reference to FIGS. 13 and 14, the location of the magnet 300 is positioned on the lifter 100 such that the roller bushing 284 of the driver pin 276A is in contact with the lowermost tooth 310A of the driver blade 26 when the driver blade 26 is in the ready position. The location of the magnet 300 on the lifter 100 may be selected based on how much the lifter 100 needs to rotate for displacing the driver blade 26 upward from the ready position (which is slightly below TDC; FIG. 13) to the TDC position (FIG. 14) (i.e., when the lower-most tooth 310 on the driver blade 26 slips off the roller bushing 284 of the drive pin 276A and the driver blade 26 fires). In other words, the angular distance traveled by the drive pin 276A and its roller bushing 284 corresponds to the linear distance traveled by the driver blade 26 from the ready position to the TDC position. As such, reducing the angular distance traveled by the drive pin 276A and its roller bushing 284 after the user pulls the trigger 48 will also reduce the time it takes for the driver blade 26 to fire after the user initiates a firing cycle (by pulling the trigger 48). For example, in the illustrated embodiment, when the driver blade 26 is in the ready position, the drive pin 276A (and its roller bushing 284) is at an angle A1 relative to a horizontal plane 332 extending through a rotational axis of the lifter 100 (i.e., rotational axis 178 of FIG. 8). As shown in FIG. 14, when the driver blade 26 is in the TDC position, the drive pin 276A (and its roller bushing 284) is at an angle A2 relative to the horizontal plane 332. The magnet 300 is positioned such that the lifter 100 has to rotate the difference ΔA between angle A2 and angle A1 when moving the driver blade 26 from the ready position to the TDC position (i.e., after the user pulls the trigger 48. In the illustrated embodiment, the magnet 300 is located on the lifter 100 such that the lifter 100 has to rotate the difference ΔA of about 7 degrees to about 14 degrees before the driver blade 26 is fired, thereby causing the fastener to be quickly fired (discussed in more detail below) after the user pulls the trigger 48.

The driver 10 also includes a start-up sequence utilizing the relationship between the sensor 296 and the magnet 300. More specifically, after the user pulls the trigger 48, the motor 46 is configured to be activated to begin rotation of the lifter 100, thereby lifting of the driver blade 26 from the ready position to the TDC position. A controller of the driver 10 controls the motor 46 to operate in a plurality of stages based on an angular distance of the magnet 300, coupled for co-rotation with the lifter 100, relative to the sensor 296. For example, in some embodiments, the controller may control operation of the motor 46 to operate in three stages. In a first stage, the controller starts driving the motor at 100% pulse width modulation (PWM) duty cycle for a first time period (i.e., the controller ignores inrush current in the first time period). In a second stage, once the magnet 300 has rotated a first predetermined angular distance relative to the sensor 296, the controller drives the motor at 50% PWM duty cycle for a second time period. The second stage is configured to avoid the driver pins 276 or the teeth 310 from being damaged if they happen to be misaligned when the firing cycle is initiated. In a third stage, once the magnet 300 has rotated a second predetermined angular distance relative to the sensor 296, the controller drives the motor at 100% PWM again for a third time period (i.e., after the time when the driver pins 276 or the teeth 310 would have been misaligned), until the driver blade 26 is lifted to the TDC position. The second predetermined angular distance may be based on how much the motor 46 needs to rotate to ensure that the lifter 100 (i.e., driver pins 276) has meshed with the teeth 310. This start-up sequence may be used in conjunction with an electronic clutch that stops driving the motor 46 in response to a lack of Hall transitions for a certain period of time (e.g., 20 ms) indicating a stalled/stuck motor. Accordingly, the start-up sequence is configured to inhibit or prevent a jam in the driver 10.

The controller of the driver 10 further includes a relay electrically connected between the battery pack 90 and the motor 46. The relay is configured to be adjustable between an open state, in which power cannot be transferred from the battery pack 90 to the motor 46, and a closed state, in which power is transferable from the battery pack 90 to the motor 46. The controller is configured to send a control signal to determine whether the relay is in the open state or the closed state. This may be referred to as a relay check. The relay check may be activated when the user pulls and holds the trigger 48 to begin a firing cycle. In the illustrated embodiment, if the controller determines during the relay check that the relay is in the open state, the controller determines that the driver 10 is not ready to fire a fastener and the motor 46 will remain deactivated. Subsequently, the controller sends another control signal to energize a coil of the relay, thereby switching the relay from the open state to the closed state. If the controller determines during the relay check that the relay is in the closed state, the controller determines that the driver 10 is ready to fire a fastener.

The driver 10 may be operable in a plurality of modes that utilize the trigger 48 and a workpiece contact arm or arm member 410. In the illustrated embodiment, the driver 10 is operable in a sequential actuation mode, in which the trigger 48 and the arm member 410 must both be sequentially actuated (i.e., when the arm member 410 is pressed against a workpiece) to initiate a firing cycle, and a contact actuation mode (i.e., bump-fire), in which the trigger 48 may remain depressed and only the arm member must be actuated to initiate consecutive firing cycles. The controller is configured to perform the relay check right after the user pulls the trigger 48 in each of the plurality of modes. In particular, for the contact actuation mode, the relay check may be performed prior to actuation of the arm member 410. This may further decrease the time it takes from when the user pulls the trigger 48 to when the motor 46 is activated to lift the driver blade 26 from the ready position to the TDC position. For example, in the illustrated embodiment, the time period is between 5 milliseconds and 10 milliseconds. In another embodiment, the time period is 6 milliseconds. This time period may be referred to as the “electrical time to fire.”

Furthermore, a time period between when a user actuates the trigger 48 to when the driver blade 26 begins movement from the TDC position toward the BDC position may be termed as a "tool time to fire". A combination of the predetermined location of the magnet 300 on the lifter 100 and the adjustment in the electrical time to fire (i.e., the adjustment of the relay check to being performed prior to actuation of the arm member 410), may decrease the total tool time to fire. In the illustrated embodiment, relocating the magnet 300 as described above reduced the total tool time to fire between 3 milliseconds and 7 milliseconds, and more specifically about 5 milliseconds. In the illustrated embodiment, with both of the abovementioned improvements, the total tool time to fire is between 60 milliseconds and 40 milliseconds. In another embodiment, the total tool time to fire is between 50 milliseconds and 40 milliseconds. In yet another embodiment, the total tool time to fire is between 45 milliseconds and 40 milliseconds.

With reference to FIGS. 15A and 15B, the driver blade 26 includes a slot 338 extending along the driving axis 38. The slot 338 is configured to receive a rib 342 (FIG. 16) extending from the nosepiece guide 330. The rib 342 is configured to facilitate movement of the driver blade 26 along the driving axis 38 and inhibit movement of the driver blade 26 off-axis. (i.e., left or right from the frame of reference in FIG. 16.)

With reference to FIGS. 2-3 and 13-14, the driver 10 further includes a latch assembly 350 having a pawl or latch 354 for selectively holding the driver blade 26 in the ready position, and a solenoid 358 for releasing the latch 354 from the driver blade 26. In other words, the latch assembly 350 is moveable between a latched state (FIG. 13) in which the driver blade 26 is held in the ready position against a biasing force (i.e., the pressurized gas in the storage chamber 30), and a released state (FIG. 14) in which the driver blade 26 is permitted to be driven by the biasing force from the ready position to the driven position. The latch 354 is pivotably supported by a shaft 362 on the nosepiece guide 330 about a latch axis 366 (FIG. 3). The latch axis 366 is parallel to a rotational axis 368 of the lifter 100 (FIG. 3). Specifically, the latch 354 is positioned between two bosses 370 of the nosepiece guide 330 such that the shaft 362 is supported on both sides by the nosepiece guide 330. This may reduce stress on the latch 354.

With reference to FIGS. 2 and 3, the latch assembly 350 is positioned proximate the side 322 of the driver blade 26. The solenoid 358 is supported by a boss 374 extending from the lifter housing portion 292 (FIG. 2). As such, the solenoid 358 defines a solenoid axis 398 that extends parallel to the driving axis 38 (i.e., to the lifter housing portion 292). Furthermore, the latch 354 is configured to rotate about the shaft 362 relative to the latch axis 366 such that a tip 378 of the latch 354 is configured to engage a stop surface 382 of the nosepiece guide 330 (FIG. 13) when the latch 354 is moved toward the driver blade 26, as further discussed below.

With reference to FIGS. 2 and 3, the solenoid 358 includes a solenoid plunger 386 for moving the latch 354 out of engagement with the driver blade 26 when transitioning from the latched state (FIG. 13) to the released state (FIG. 14). The plunger 386 includes a first end positioned within the solenoid 358 and a second end coupled to the latch 354 (FIG. 3). In the illustrated embodiment of the driver 10, the plunger 386 includes a slot 360 that receives a corresponding radially extending tab 364 on the latch 354 (FIG. 2). The tab 364 is loosely fitted within the slot 360 to permit the tab 364 to both translate and pivot within the slot 360 relative to the plunger 386.

Displacement of the plunger 386 pivots the latch 354 about the latch axis 366. Specifically, when the solenoid 358 is energized, the plunger 386 retracts along the solenoid axis 398 (FIG. 3) into the body of the solenoid 358, pivoting the latch 354 about the latch axis 366 in a clockwise direction from the frame of reference of FIG. 2, thereby making the latch 354 non-engageable with the driver blade 26 (FIG. 14). In other words, the latch 354 is spaced from the projections 318 of the driver blade 26, concluding the transition of the latch assembly 350 to the released state. When the solenoid 358 is de-energized, an internal spring bias within the solenoid 358 causes the plunger 386 of the solenoid 358 to extend along the solenoid axis 398, causing the latch 354 to pivot in an opposite direction about the latch axis 366. Specifically, as the plunger 386 extends, the latch 354 rotates about the latch axis 366 toward the driver blade 26, concluding the transition to the latched state shown in FIG. 13. In alternative embodiments, one or more springs may be used to separately bias the plunger 386 and/or the latch 354 to assist the internal spring bias within the solenoid 358 in returning the latch assembly 350 to the latched state.

The latch 354 is moveable between a latched position (coinciding with the latched state of the latch assembly 350 shown in FIG. 13) in which the latch 354 is engaged with one of the projections 318A on the driver blade 26 for holding the driver blade 26 in the ready position against the biasing force of the compressed gas, and a released position (coinciding with the released state of the latch assembly 350 shown in FIG. 14) in which the driver blade 26 is permitted to be driven by the biasing force of the compressed gas from the ready position to the driven position. Furthermore, the stop surface 270, against which the latch 354 is engageable when the solenoid 358 is de-energized, limits the extent to which the latch 354 is rotatable in a counter-clockwise direction from the frame of reference of FIG. 2 about the latch axis 366 upon return to the latched state.

With reference to FIGS. 2 and 3, the driver 10 further includes the arm member 410 positioned on an end 406 of the nosepiece guide 330. The arm member 410 includes a first end 414 and a second end 418 positioned opposite the first end 414 along the driving axis 38. The first end 414 is proximate the end 406 and configured to engage the workpiece. The second end 418 may be connected to a depth of drive adjustment mechanism 422. Specifically, a depth that the arm portion 410 extends relative to the end 406 of the nosepiece guide 330 is adjustable using the depth of drive adjustment mechanism 422. Furthermore, the illustrated driver 10 includes a bracket member 426 positioned between the lifter housing portion 292 and the nosepiece guide 330 (FIG. 2). The bracket member 426 is configured to support the arm portion 410 and the depth of drive adjustment mechanism 422. The bracket member 426 may be secured to the driver 10 by the lifter housing portion 292 and the nosepiece guide 330. The bracket member 426 may reduce additional mounting brackets, fasteners such as screws, and/or assembly time.

Figure 21:
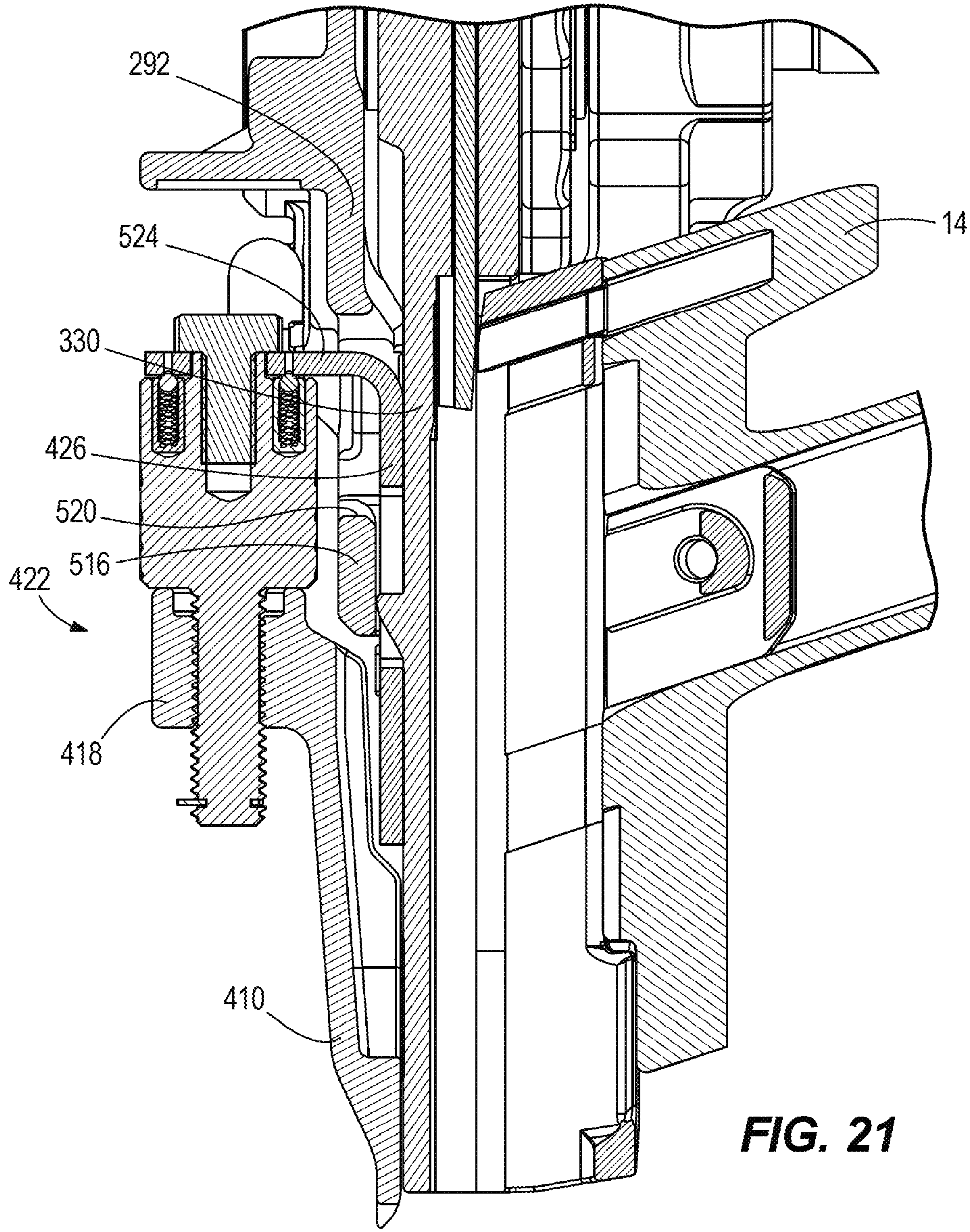
FIG. 21 is a partial cross-sectional view of a portion of a nosepiece assembly of the gas spring-powered fastener driver of FIG. 3.

More specifically, as illustrated in FIG. 21, the bracket member 426 is mounted between an end portion 516 of the lifter housing portion 292 and the nosepiece guide 330. The end portion 516 of the lifter housing portion 292 includes a cut-out or window 520. A flange portion 524 of the bracket member 426 extends through the window 520. The flange portion 524 is connected to the depth of drive adjustment mechanism 422. The bracket member 426 is securably coupled between the lifter housing portion 292 and the nosepiece guide 330. As such, during assembly of the driver 10, the bracket member 426 is mounted between the lifter housing portion 292 and the nosepiece guide 330, and the depth of drive adjustment mechanism 422 is mounted to the flange portion 524 of the bracket member 426 extending through the window 520. Subsequently, the arm member 410 (i.e., the second end 418) is rotatably coupled to the depth of drive adjustment mechanism 422.

With reference to FIG. 5, the driver 10 includes a bumper 442 positioned beneath the piston 22 for stopping the piston 22 at the driven position (FIG. 6A) and absorbing the impact energy from the piston 22. The bumper 442 is configured to distribute the impact force of the piston 22 uniformly throughout the bumper 442 as the piston 22 is rapidly decelerated upon reaching the driven position (i.e., the bottom dead center position).

With reference to FIG. 5, the bumper 442 is received within the cylinder 18 and clamped into place by the lifter housing portion 292, which is threaded to the bottom end of the cylinder 18. The bumper 442 is received within a cutout 454 formed in the lifter housing portion 292. The cutout 454 coaxially aligns the bumper 442 with respect to the driver blade 26. In alternative embodiments, the lifter housing portion 292 and the bumper 442 may be supplemented with additional structure for inhibiting relative rotation between the bumper 442 and the recess 446 (e.g., a key and keyway arrangement).

Figure 17:
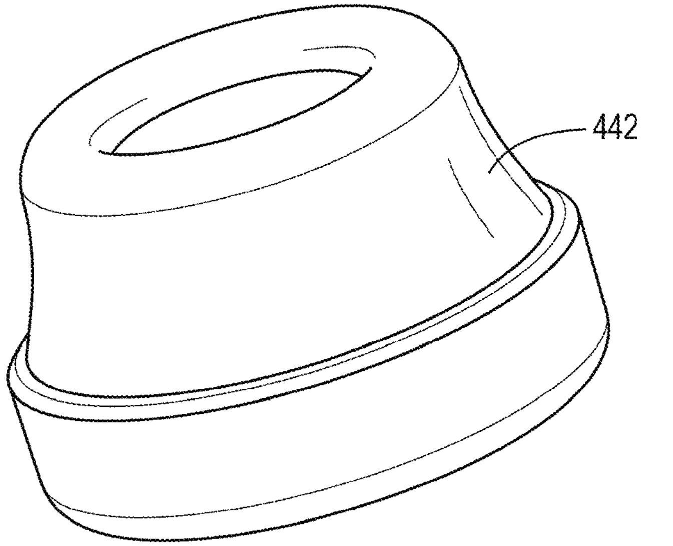
FIG. 17 is a perspective view of a bumper of the gas spring-powered fastener driver of FIG. 1.

With reference to FIGS. 5 and 17, the bumper 442 has a volume. The volume is limited by the size of the cylinder 18. The volume of the bumper 442 may be maximized to fit within the cylinder 18 such that a thermal heat capacity of the bumper 442 may be increased. In particular, the bumper 442 may experience high temperatures due to the expansion of gas within the cylinder 18 during consecutive firing cycles. Furthermore, a surface area of the bumper 442 in contact with its surrounding structure may be increased, thus increasing the rate of heat transfer that occurs between the bumper 442 and its surrounding structure (e.g., the cylinder 18, etc.).

Figure 18:
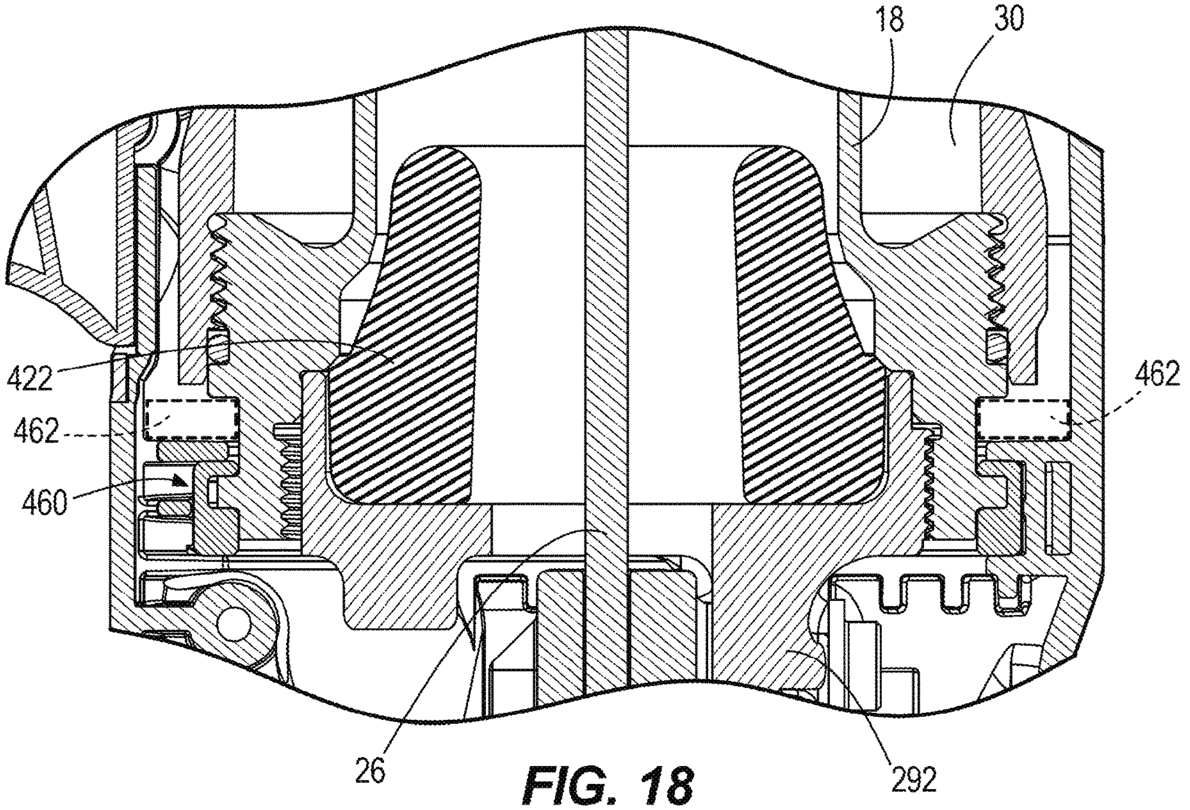
FIG. 18 is a partial cross-sectional view of the gas spring-powered fastener driver of FIG. 1, illustrating phase change material proximate the bumper.

With reference to FIGS. 5 and 18, the driver 10 further includes an annular pocket 460 around the cylinder 18. A heat sink 462 (FIG. 18) may be positioned within the pocket 460 and in thermal contact with the bumper 442 (e.g., by conduction, convection, or a combination thereof). The heat sink 462 is formed of thermally conductive material to further increase heat transfer from the bumper 442, thereby cooling the bumper 442. In one embodiment of the driver 10, the material is a phase change material (PCM), which slowly absorbs heat from the bumper 442 during the course of operation of the driver 10, keeping the temperature of the bumper 442 relatively low without substantially increasing the weight of the driver 10. This may inhibit bumper failure and prolong the useful life of the driver 10.

Figure 19:
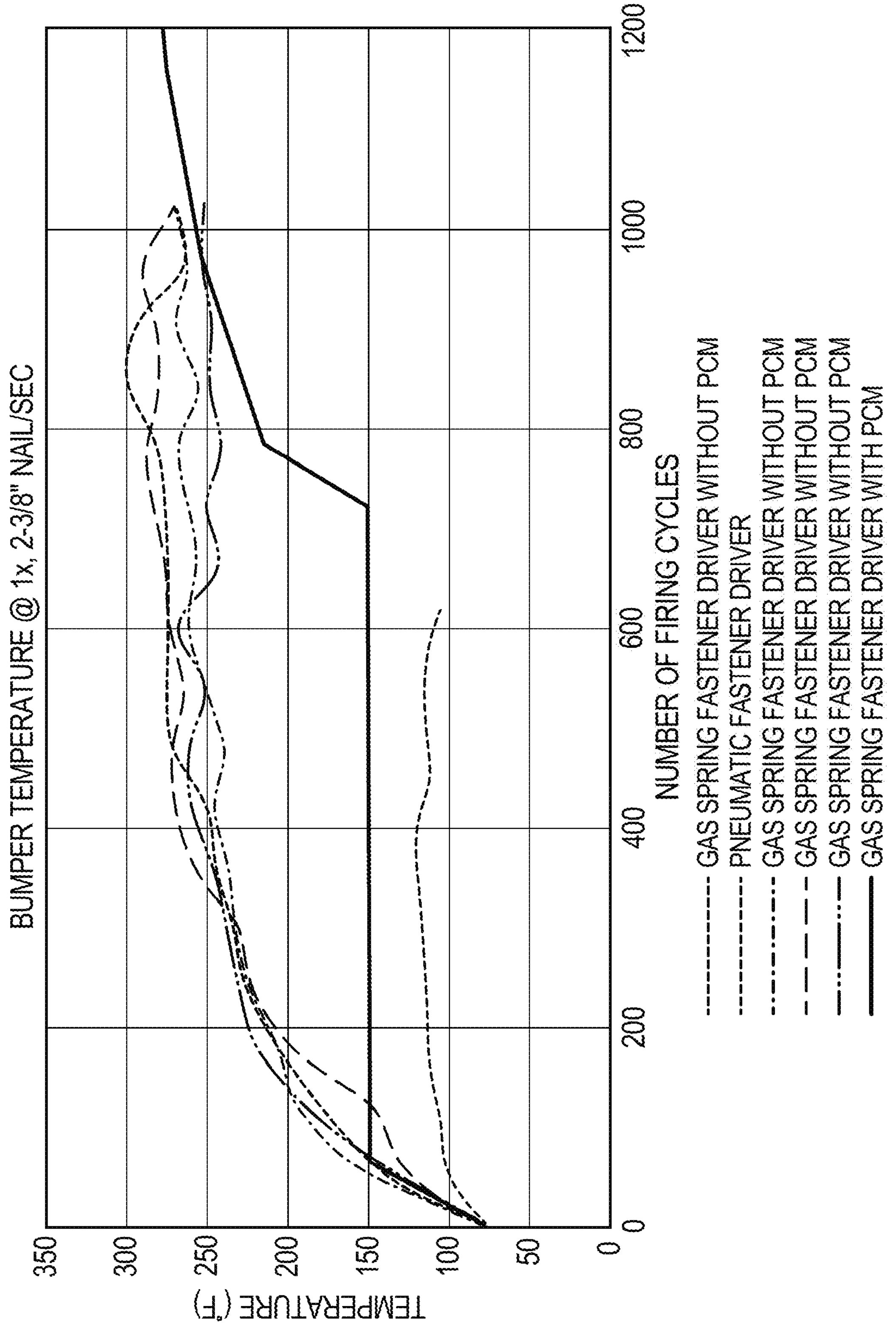
FIG. 19 is a graph illustrating a temperature of the bumper of FIG. 17 over a number of firing cycles with phase change material proximate the bumper.

For example, as illustrated in FIG. 19, an increase in the temperature of the bumper 442 is substantially inhibited for about 900 firing cycles of the driver 10 having the phase change material relative to bumpers in similar fastener drivers without the phase change material positioned proximate the bumpers. Further, as shown in FIG. 19, the phase change material is configured to maintain the bumper 442 at a temperature of 150 degrees Fahrenheit or less for at least 600 firing cycles. As such, the increase in the temperature of the bumper 442 may be substantially inhibited for a longer period of time than fastener drivers without the phase changer material positioned proximate the bumpers. In particular, the phase change material may be configured to change phase at a predetermined temperature limit. The predetermined temperature limit may be determined based on the temperature the bumper 442 reaches at which permanent damage to the bumper 442 might otherwise occur. Furthermore, the amount of phase change material positioned in the pocket 460 may be determined based on the desired overall weight and/or size of the driver 10 while maximizing thermal protection of the bumper 442.

With reference to FIGS. 6A-6B and 13-14, the operation of a firing cycle for the driver 10 is illustrated and detailed below. With reference to FIGS. 6B and 13, prior to initiation a firing cycle, the driver blade 26 is held in the ready position with the piston 22 near top dead center within the cylinder 18. More specifically, the bushing 284 associated with the drive pin 276A (FIG. 13) on the lifter 100 is engaged with a lower-most tooth 310A of the axially spaced teeth 310 on the driver blade 26, and the rotational position of the lifter 100 is maintained by the one-way clutch mechanism 154. In other words, as previously described, the one-way clutch mechanism 154 prevents the motor 46 from being back-driven by the transmission 92 when the lifter 100 is holding the driver blade 26 in the ready position. Also, in the ready position of the driver blade 26 (FIG. 13), the latch 354 is engageable with a lower-most projection 318A on the driver blade 26, though not necessarily in contact with and functioning to maintain the driver blade 26 in the ready position. Rather, the latch 354 at this instant provides a safety function to prevent the driver blade 26 from inadvertently firing should the one-way clutch mechanism 154 fail.

With reference to FIG. 14, upon the trigger 48 being pulled to initiate a firing cycle, the solenoid 358 is energized to pivot the latch 354 from the latched position shown in FIG. 13 to the release position shown in FIG. 14, thereby repositioning the latch 354 so that it is no longer engageable with the projection 318A (defining the released state of the latch assembly 350). At about the same time, the motor 46 is activated to rotate the transmission output shaft 96 and the lifter 100 in a counter-clockwise direction from the frame of reference of FIG. 4, thereby displacing the driver blade 26 upward past the ready position a slight amount before the lower-most tooth 310 on the driver blade 26 slips off the drive pin 276A (at the TDC position of the driver blade 26). Because the roller bushings 284 are rotatable relative to the drive pins 276 upon which they are supported, subsequent wear to the drive pin 276 and the teeth 310 is reduced. Thereafter, the piston 22 and the driver blade 26 are thrust downward toward the driven position (FIG. 6A) by the expanding gas in the cylinder 18 and storage chamber cylinder 30. As the driver blade 26 is displaced toward the driven position, the motor 46 remains activated to continue counter-clockwise rotation of the lifter 100.

With reference to FIG. 5, upon a fastener being driven into a workpiece, the piston 22 impacts the bumper 442 to quickly decelerate the piston 22 and the driver blade 26, eventually stopping the piston 22 in the driven or bottom dead center position.

With reference to FIG. 16, shortly after the driver blade 26 reaches the driven position, a first of the drive pins 276 on the lifter 100 engages one of the teeth 310 on the driver blade 26 and continued counter-clockwise rotation of the lifter 100 raises the driver blade 26 and the piston 22 toward the ready position. Shortly thereafter and prior to the lifter 100 making one complete rotation, the solenoid 358 is de-energized, permitting the latch 354 to re-engage the driver blade 26 and ratchet around the projections 318 as upward displacement of the driver blade 26 continues (defining the latched state of the latch assembly 350).

After one complete rotation of the lifter 100 occurs, the latch 218 maintains the driver blade 26 in an intermediate position between the driven position and the ready position while the lifter 100 continues counter-clockwise rotation (from the frame of reference of FIG. 4) until the first of the drive pins 276A re-engages another of the teeth 310 on the driver blade 26. Continued rotation of the lifter 100 raises the driver blade 26 to the ready position, which is detected by the sensor 296 as described above. Should the driver blade 26 seize during its return stroke (i.e., from an obstruction caused by foreign debris), the torque-limiting clutch mechanism 214 slips, diverting torque from the motor 46 to the ring gear 138 in the second planetary stage 86 and causing the ring gear 190 of the third planetary stage 108 to rotate within the cover 210. As a result, excess force is not applied to the driver blade 26 which might otherwise cause breakage of the lifter 100 and/or the teeth 310 on the driver blade 26.

Figure 20:
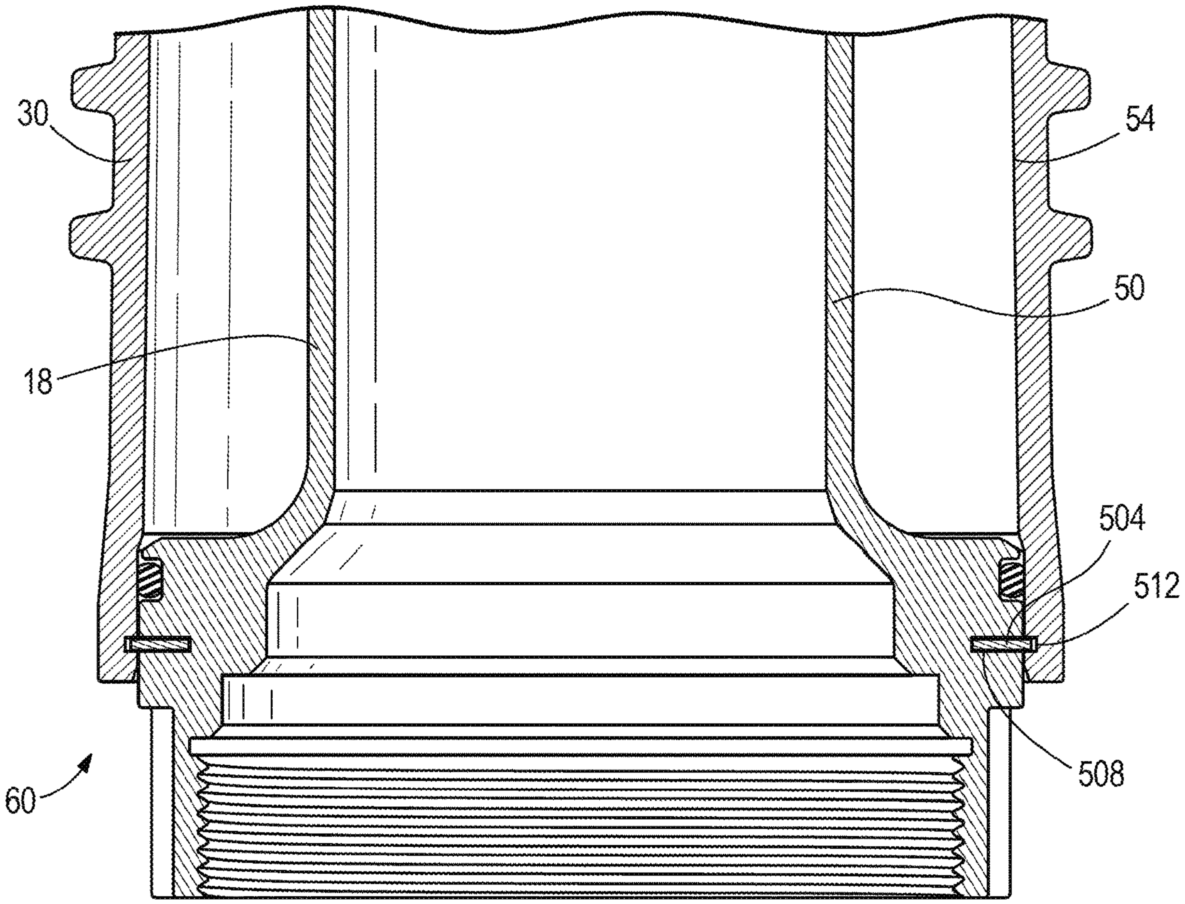
FIG. 20 is a partial cross-sectional view of a portion of a cylinder assembly of the gas spring-powered fastener driver of FIG. 1, illustrating another embodiment of a connection between an inner cylinder and an outer cylinder of the cylinder assembly.

FIG. 20 illustrates an alternative embodiment of the coupling between the cylinder 18 and the storage chamber cylinder 30 as shown in FIG. 5. More specifically, instead of providing threads (i.e., threaded section 58) on the cylinders 18, 30, the cylinder 18 includes a retaining member 504 received in a groove 508 of the cylinder 18. The retaining member 504 is securably attached to the groove 508. The storage chamber cylinder 30 includes a corresponding groove 512 to receive the retaining member 504. As such, the cylinder 18 is configured to be axially secured to the storage chamber cylinder 30 via the retaining member 504. In the illustrated embodiment, the retaining member 504 has an annular shape. Similar to the embodiment shown in FIG. 5, the storage chamber cylinder 30 is rotatably movable relative to the cylinder 18 for displaying the indicia region 62 in the desired orientation. Furthermore, the retaining member 504 may reduce or inhibit angular stack-up for the storage chamber cylinder 30, and may simplify assembly of the driver 10.

With reference to FIG. 5, an intermediate chamber 530 is formed between a bottom portion 534 of the cylinder 18 and the bumper 442/piston 22 when the driver blade 26 is approaching the BDC position. More specifically, the intermediate chamber 530 is completely sealed (i.e., not fluidly connected to the outside atmosphere) when the piston 22 impacts the bumper 442. If at this time the pressure within the sealed intermediate chamber 530 exceeds the pressure of the gas within the cylinder 18, some of the gas within the sealed intermediate chamber 530 may partially unseat a sealing element (e.g., an O-ring 538) between the piston 22 and the inner cylinder 18, creating a path for the higher-pressure gas within the intermediate chamber 530 to leak into the cylinder 18, which contains gas at a lower pressure. Any additional gas "pumped" into the inner cylinder 18 in this manner, over multiple firing cycles, can increase the pressure of the gas acting on the driver piston 22 and affect the intended performance of the driver 10.

Figure 22:
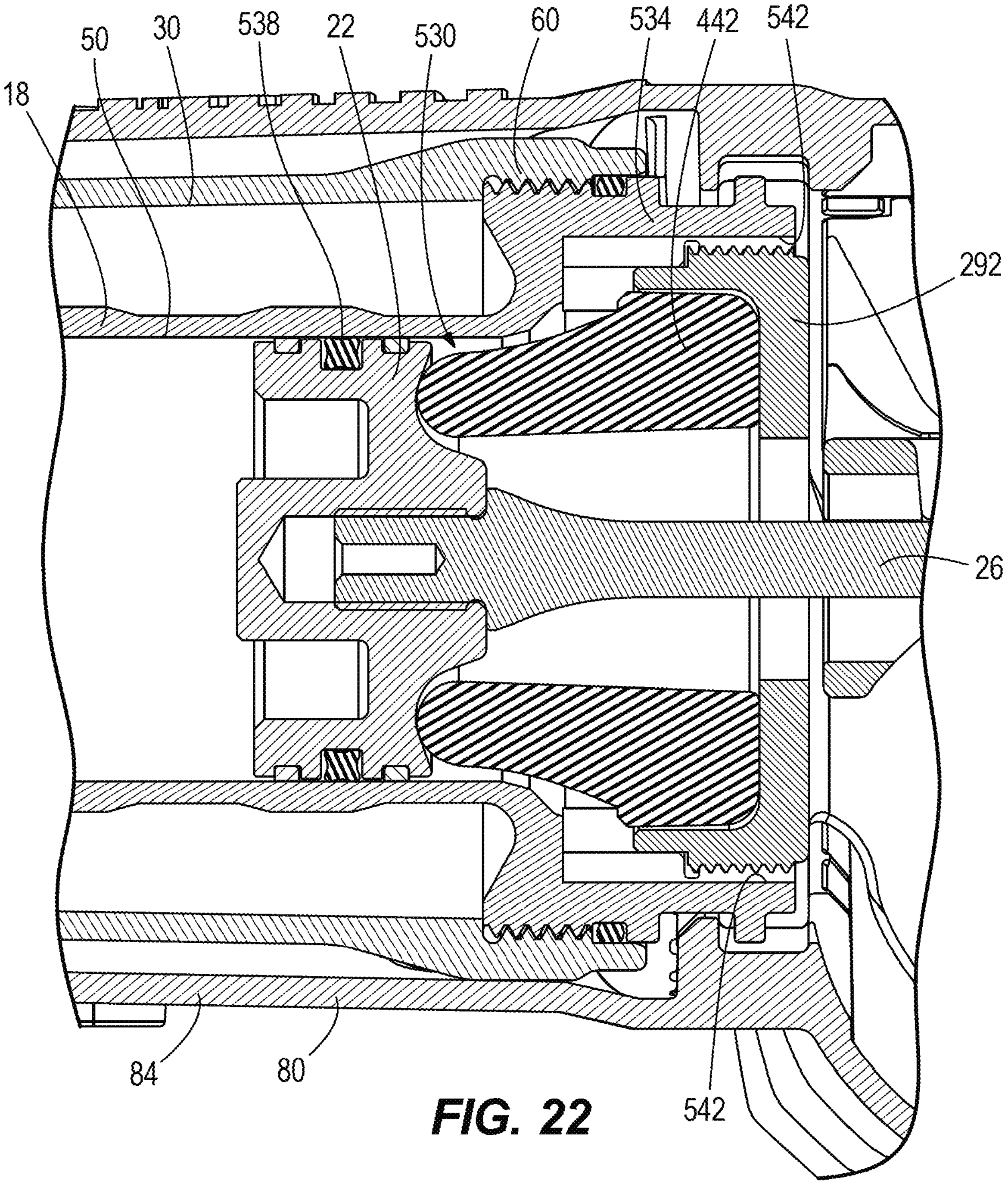
FIG. 22 is a partial cross-sectional view of the gas spring-powered fastener driver of FIG. 1, illustrating a portion of an alternative embodiment of a cylinder assembly of the gas spring-powered fastener driver of FIG. 1.

As illustrated in FIG. 22, in an alternative embodiment of the fastener driver 10, the lifter housing portion 292 is threaded to the bottom end of the cylinder 18, and slots 542 are provided between the lifter housing portion 292 and the inner cylinder 18 (i.e., through their threaded connection), such that the intermediate chamber 530 cannot be sealed when the piston 22 impacts the bumper 442. More specifically, the intermediate chamber 530 is fluidly connected to the outside atmosphere via the slots 542 at any location of the piston 22/driver blade 26 between the TDC and BDC positions. In the illustrated embodiment, the slots 542 are machined into the inner periphery of the inner cylinder 18 and are oriented parallel with the driver blade 26. The slots 542 prevent or inhibit buildup of pressure in the intermediate chamber 530 as the piston 22/driver blade 26 approaches the BDC position and the bumper 442 is being compressed by the piston 22. As such, the pressure in the intermediate chamber 530 cannot exceed the pressure within the inner cylinder 18, preventing the O-ring 538 from unseating in the manner described above such that the cylinder 18 is prevented from being fluidly connected to the intermediate chamber 530.

Figure 23:
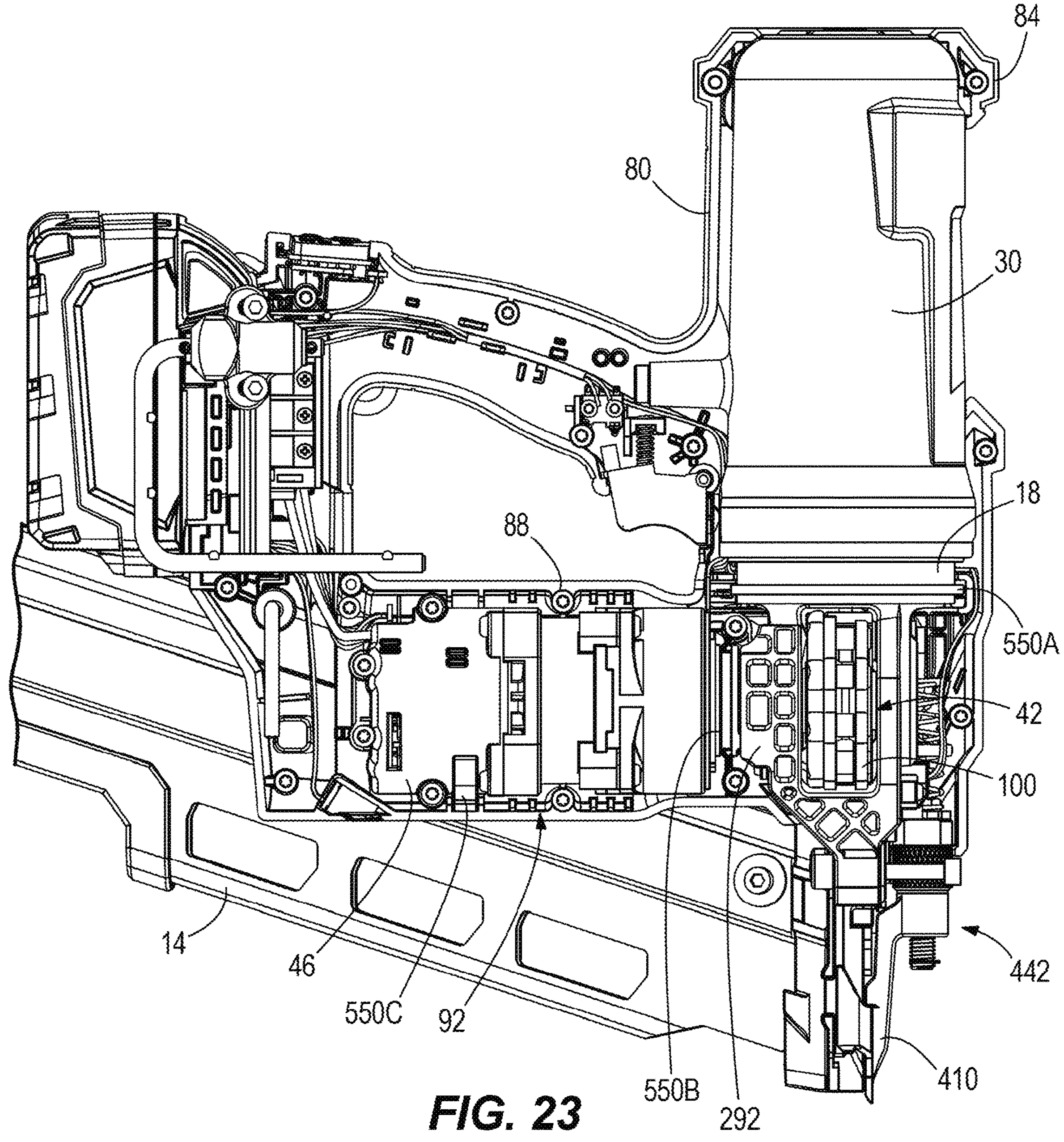
FIG. 23 side view of the gas spring-powered fastener driver of FIG. 1, with portions removed for clarity, and illustrating a plurality of damping elements.

With reference to FIG. 23, the driver 10 includes a plurality of cushions or damping elements 550A-550C positioned between the housing 80 and internal components 18, 46, 92 of the driver 10. In the illustrated embodiment, a first damping element 550A is positioned between the cylinder 18 and the cylinder support portion 84 of the housing 80. In other embodiments, the first damping element 550A may be positioned at other locations such as between the storage chamber cylinder 30 and the cylinder support portion 84. In addition, the illustrated driver 10 includes a second damping element 550B positioned between the transmission 92 and the motor support portion 88 of the housing 80, and a third damping element 550C positioned between the motor 46 and the motor support portion 88. The first and second damping elements 550A, 550B, respectively, have an annular shape. The damping elements 550A-550C are formed by elastic material, such as rubber, for absorbing energy that may be transferred from the gas spring during a firing operation to the housing 80 of the driver 10. For example, if the lifter housing portion 292 is rigidly coupled to a housing of the transmission 92, when the driver blade 26 is driven to the BDC position, the force of the gas spring may cause a pivoting force to be applied to the motor 46/transmission 92 at the point when the lifter housing portion 292 is rigidly coupled to the transmission 92. The position of the third damping element 550C, in particular, is configured inhibit pivotal movement of the motor 46/transmission 92 relative to the rigid connection point. As such, the cylinder 18 and/or the motor 46/transmission 92 is not rigidly mounted (movable) within the housing 80. In the illustrated embodiment, the driver 10 includes three damping elements 550A-550C. In other embodiments, the driver 10 may include one or more damping elements (e.g., two, four, etc.) positioned at any location within the housing 80.

With reference to FIGS. 15A-15B, the driver blade 26 may have a portion that has a first hardness, and another portion that has a greater hardness than the first portion. More specifically, the body 312 of the driver blade 26 and at least some of the teeth 310 and the projections 318 of the driver blade 22 are formed by a first material, such as metal, such that a first portion of the driver blade 22 has a first hardness. One or more of the remaining teeth 310 may be formed by a different material or subject to a post-manufacturing process such that they have a second hardness that is greater than the first hardness. For example, the lower-most tooth 310A of the driver blade 26, which is subject to higher forces than the other teeth 310 during lifting of the driver blade 26 by the lifter assembly 42 to the TDC position, is formed from a harder material or otherwise has a greater hardness than the remaining teeth 310 to reduce premature wear. In one embodiment, the lower-most tooth 310A is formed from carbide. In another embodiment, the lower-most tooth 310A is coated with a carbide layer. Further, in another embodiment, the lower-most tooth 310A is hardened by the process of induction hardening. In other embodiments, one or more of the teeth 310 and/or the projections 318 may have the second, greater hardness.

Figure 25A:
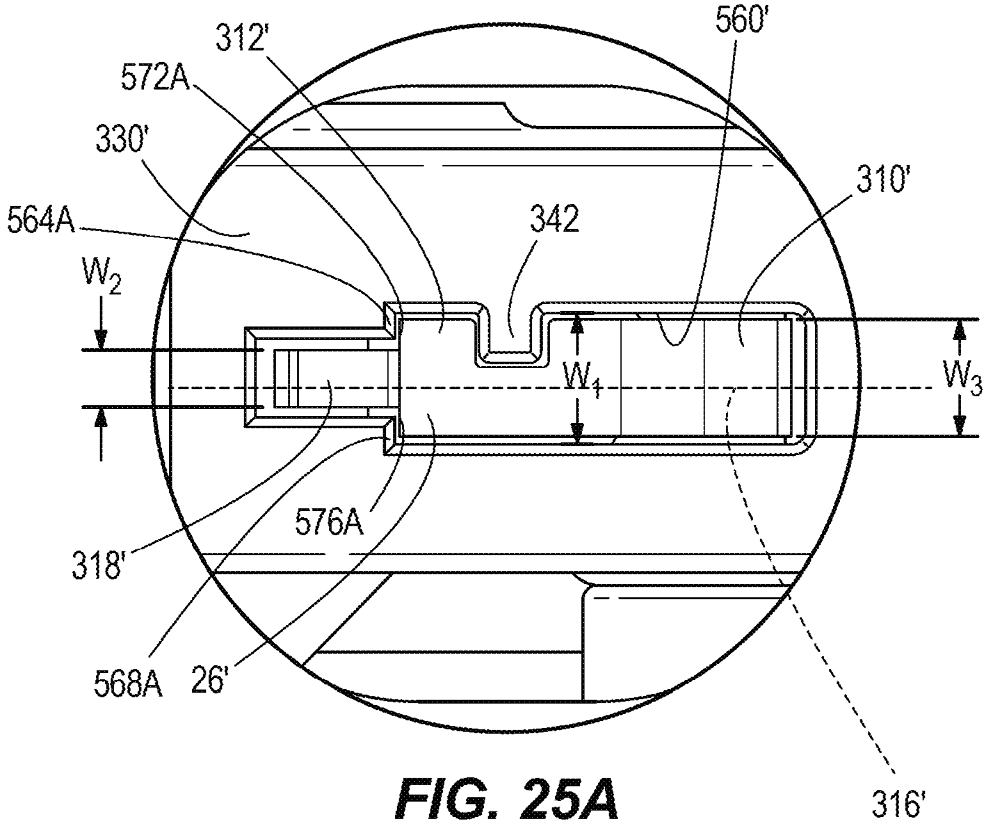
FIG. 25A is a bottom view of a portion of the fastener driver of FIG. 1, illustrating the driver blade supported within another embodiment of a nosepiece guide of the gas spring-powered fastener driver of FIG. 1.
Figure 25B:
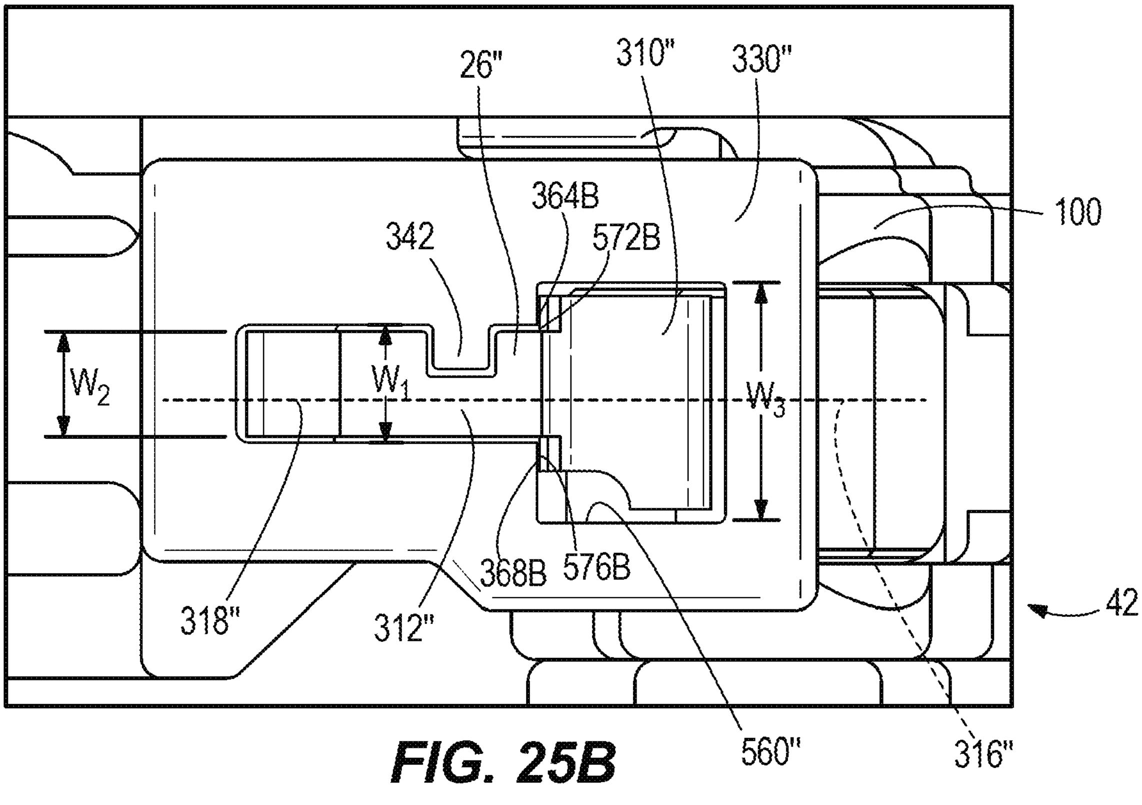
FIG. 25B is a bottom view of a portion of the fastener driver of FIG. 1, illustrating the driver blade supported within yet another embodiment of a nosepiece guide of the gas spring-powered fastener driver of FIG. 1.

FIGS. 25A-25B illustrate alternative embodiments of the driver blade 26 as shown in FIGS. 15A-16. In particular, as shown in FIG. 16, the body 312 of the driver blade 26 and each of the teeth 310 and the projections 318 are bisected by the common plane 316. The body 312 includes a first width W relative to the plane 316. The projections 318 and the teeth 310 in FIG. 16 each have the same width W as the body 312. In the alternative embodiments of the driver blade 26', 26" (shown in FIGS. 25A and 25B), the body 312', 312" has a first width W1, and a width W2 of the projections 318', 318" and/or a width W3 of the teeth 310', 310" may have a different width (i.e., smaller, larger) than the width W1 of the body 312', 312" in a direction perpendicular to the common plane 316', 316", respectively. For example, as shown in FIG. 25A, the projections 318' have a width W2 that is smaller than the width W1 of the body 312' of the driver blade 26'. In another example, as shown in FIG. 25B, the teeth 310" have a width W3 that is larger than the width W1 of the body 312" of the driver blade 26". In other embodiments, the projections 318 may have a width that is larger than the width of the body 312 of the driver blade 26, or the teeth 310 may have a width that is smaller than the width of the body 312 of the driver blade 26. The different sized or stepped widths W2, W3 of the driver blade 26', 26" define guide surfaces 572A, 572B, 576A, 576B on the driver blade 26', 26" that are spaced from the common plane 316', 316" and extend parallel to the driving axis 38.

With continued reference to FIGS. 16 and 25A-25B, the nosepiece guide 330 (FIG. 16) includes a channel 560 configured to receive the driver blade 26. As shown in FIGS. 25A-25B, the channel 560', 560" may have a plurality of widths to match the different sized widths W1, W2, W3 of the driver blade 26, such that a plurality of guide surfaces 564A, 564B, 568A, 568B that match or correspond with the guide surfaces 572A, 572B, 576A, 576B of the driver blade 26', 26" are formed within the channel 560', 560". For example, in the illustrated embodiment of FIG. 25A, the plurality of guide surfaces 564A, 564B, 568A, 568B includes first and second guide surfaces 564A, 568A, respectively, formed adjacent the intersection between the projections 318' and the body 312'. In the illustrated embodiment of FIG. 25B, the plurality of guide surfaces 564A, 564B, 568A, 568B includes first and second guide surfaces 564B, 568B, respectively, formed adjacent the intersection between the teeth 310" and the body 312". Similar to the rib 342, the plurality of guide surfaces 564A, 564B, 568A, 568B facilitate movement of the driver blade 26', 26" along the driving axis 38 and inhibit movement of the driver blade 26', 26" off-axis. More specifically, the guide surfaces 572A, 572B, 576A, 576B of the driver blade 26', 26" are slidable relative to the guide surfaces 564A, 564B, 568A, 568B of the channel 560', 560". Furthermore, the plurality of guide surfaces 564A, 564B, 568A, 568B, 572A, 572B, 576A, 576B may inhibit pivoting or twisting of the driver blade 26', 26" about the rib 342 of the nosepiece guide 330', 330" within the channel 560', 560" as the driver blade 26', 26" is returned from the BDC position toward the TDC position. This may further maintain the orientation of the teeth 310' relative to the drive pins 276 in the desired orientation (i.e., the teeth 310', 310" are maintained orthogonal to the roller bushings 284 on the respective drive pins 276) such that a distribution of the load resulting from the contact between the drive pins 276 and the teeth 310', 310" is over the entire width of the teeth 310', 310", thereby reducing stress on the teeth 310', 310".

Various features of the invention are set forth in the following claims.

What is claimed is:

1. A gas spring-powered fastener driver comprising:

a cylinder;

a moveable piston positioned within the cylinder;

a driver blade attached to the piston and movable therewith between a top-dead-center (TDC) position and a driven or bottom-dead-center (BDC) position, the driver blade including a body and a plurality of teeth extending therefrom, the driver blade defining a driving axis; and a lifter operable to move the driver blade from the BDC position toward the TDC position, the lifter having a plurality of drive pins, at least one of the drive pins including a roller bushing positioned on the at least one drive pin and configured to engage with one of the teeth of the driver blade when moving the driver blade from the BDC position toward the TDC position, wherein each one of the plurality of teeth includes a contact surface engageable with the roller bushing and/or one of the drive pins as the lifter moves the driver blade from the BDC position toward the TDC position, and wherein the contact surface of each tooth defines an included angle with the driving axis that is greater than 90 degrees, wherein the driver blade includes an elongated body defining a first side and a second side opposite the first side, wherein the teeth extend laterally from the first side of the body, wherein a projection extends laterally from the second side of the body, wherein the body, the teeth, and the projection are bisected by a common plane that extends between the first and second sides, wherein the projection has a shape that is different from a shape of each of the plurality of teeth, wherein a latch is configured to engage the projection to maintain the driver blade between the TDC position and BDC position, and wherein the projection is one of a plurality of projections extending laterally from the second side of the body and the same shape, the latch configured to engage each of the projections, and wherein a surface of each of the plurality of projections engageable by the latch is between the contact surfaces of adjacent teeth of the plurality of teeth.

2. The gas spring-powered fastener driver of claim 1, wherein the angle is between 110 degrees and 120 degrees.

3. The gas spring-powered fastener driver of claim 2, wherein the angle is 115 degrees.

4. The gas spring-powered fastener driver of claim 1, wherein each drive pin includes a respective roller bushing positioned thereon, and wherein each roller bushing is configured to engage the contact surface of one of the teeth.

5. The gas spring-powered fastener driver of claim 1, wherein the contact surface of each tooth is disposed on a side of the tooth facing away from the piston.

6. The gas spring-powered fastener driver of claim 1, wherein each tooth includes a surface opposite the contact surface that defines an included angle that is greater than 90 degrees.

7. The gas spring-powered fastener driver of claim 1, wherein a surface of the projection engageable by the latch is offset along the driving axis relative to the contact surface of a lowermost tooth of the plurality of teeth.

8. The gas spring-powered fastener driver of claim 7, wherein the surface of the projection is closer to the piston than the contact surface of the lowermost tooth of the plurality of teeth.

9. The gas spring-powered fastener driver of claim 1, wherein the shape of each of the plurality of teeth is different from the shape of each of the plurality of projections.

* * * * *